United States Patent [19]

DiGiulio et al.

[11] Patent Number: 4,947,317

[45] Date of Patent: Aug. 7, 1990

[54] COMMUNICATION PROTOCOL FOR A THREE NODES SYSTEM HAVING DEDICATED CONNECTIONS AND BIT INDICATING FUNCTION OF EXCHANGED MESSAGE

[75] Inventors: Peter C. DiGiulio, Bridgeport; David K. Lee, Monroe, both of Conn.

[73] Assignee: Pitney Bowes Inc., Stamford, Conn.

[21] Appl. No.: 256,811

[22] Filed: Oct. 12, 1988

[51] Int. Cl.$^5$ .................. G06F 13/42; G06F 15/16
[52] U.S. Cl. .................................. 364/200; 364/228;
364/240.8; 364/240.9; 364/261.2; 371/32;
375/117; 370/48
[58] Field of Search ... 364/200 MS File, 900 MS File;
371/32; 375/117; 370/48, 49

[56] References Cited

U.S. PATENT DOCUMENTS

| | | | |
|---|---|---|---|
| 4,271,511 | 6/1981 | Manber et al. | 371/8 |
| 4,298,978 | 11/1981 | Nakamura | 370/92 |
| 4,498,169 | 2/1985 | Rozmus | 370/85 |
| 4,512,026 | 11/1985 | Vander Meiden | 375/114 |
| 4,689,786 | 8/1987 | Sidhu et al. | 370/94 |
| 4,750,176 | 6/1988 | Van Velduizen | 371/32 |
| 4,773,001 | 9/1988 | Blair et al. | 364/200 |
| 4,779,274 | 10/1988 | Takahashi et al. | 371/32 |
| 4,805,194 | 2/1989 | Wesolowski | 375/75 |

Primary Examiner—Thomas C. Lee
Attorney, Agent, or Firm—Charles G. Parks, Jr.; David E. Pitchenik; Melvin J. Scolnick

[57] ABSTRACT

A communication network comprised of a first, second and third controller node. Each of the controller nodes includes a microprocessor for generating and receiving data messages. The first nodes has a transmit pin in line communication with the receive pin of the second nodes and has a receive pin in line communication with the transmit pin of the second node. The third controller receive pin is in line communication with the transmit pin of the first node and its transmit pin is in line communication with the receive pin of the first node. The microprocessors are programmed to respond to and generate suitable formatted data message bytes. The microprocessors are further programmable to respond only to a unique address-command data message byte from the message source node. The microprocessor will then issue a reply message byte to the destination node. The transmitting node will then send a data message. Where the receiving node is the third node, a data message from the third node must then follow. The protocol is software implemented and includes means of detecting a message error and resolving transmission line content.

6 Claims, 26 Drawing Sheets

| FIG. 4A |
| FIG. 4B |

NODE 1 COMMANDS TO LINK NODES 2 & 3

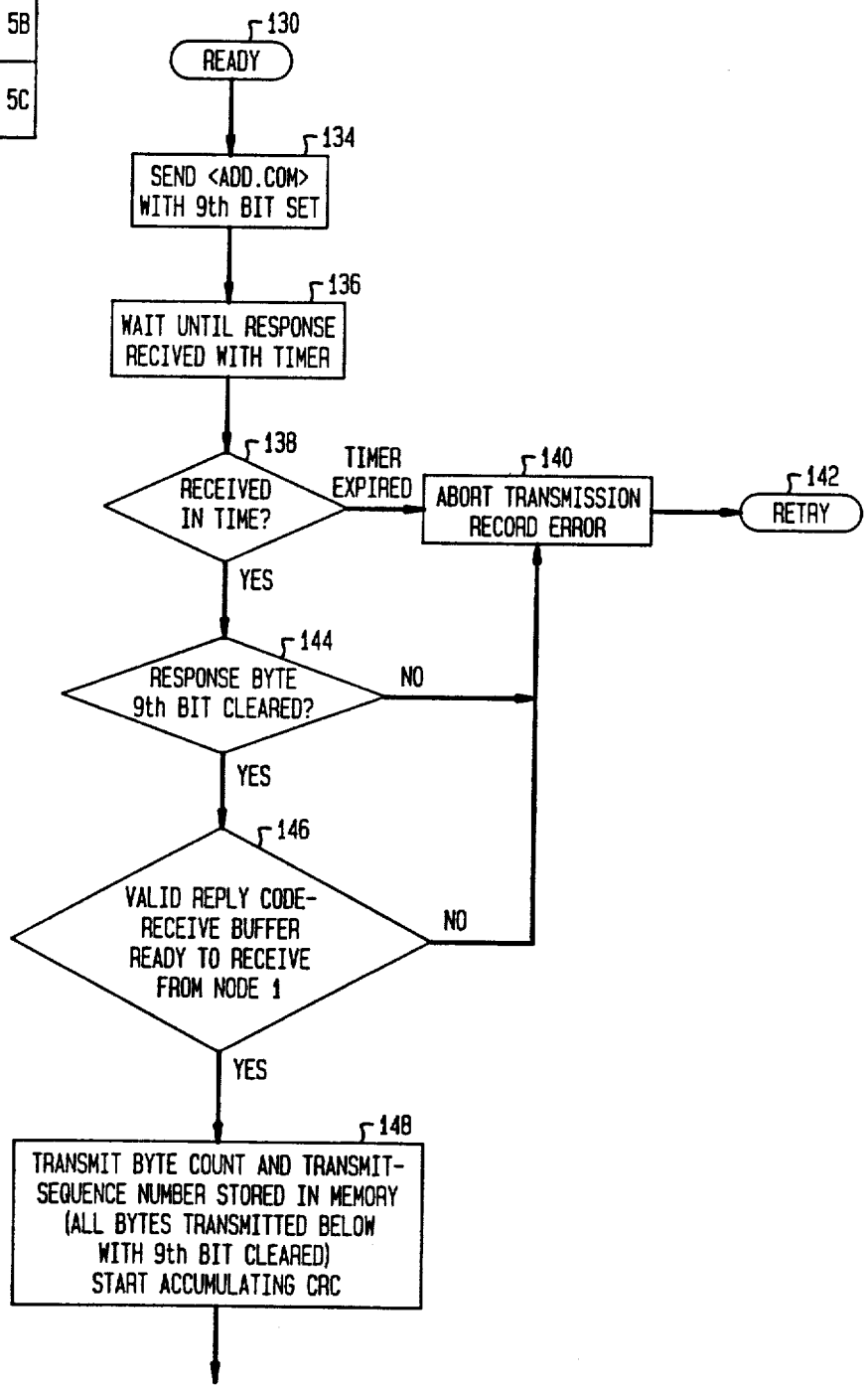

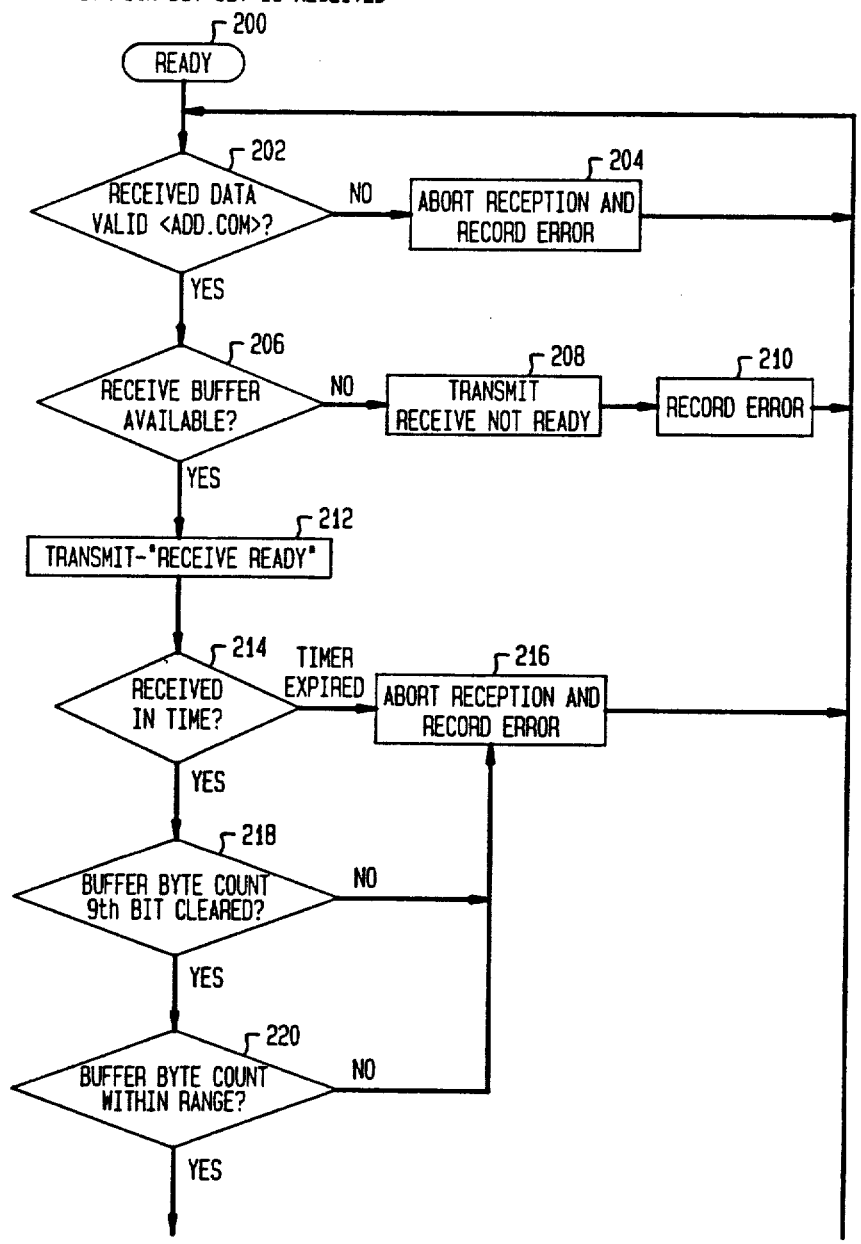

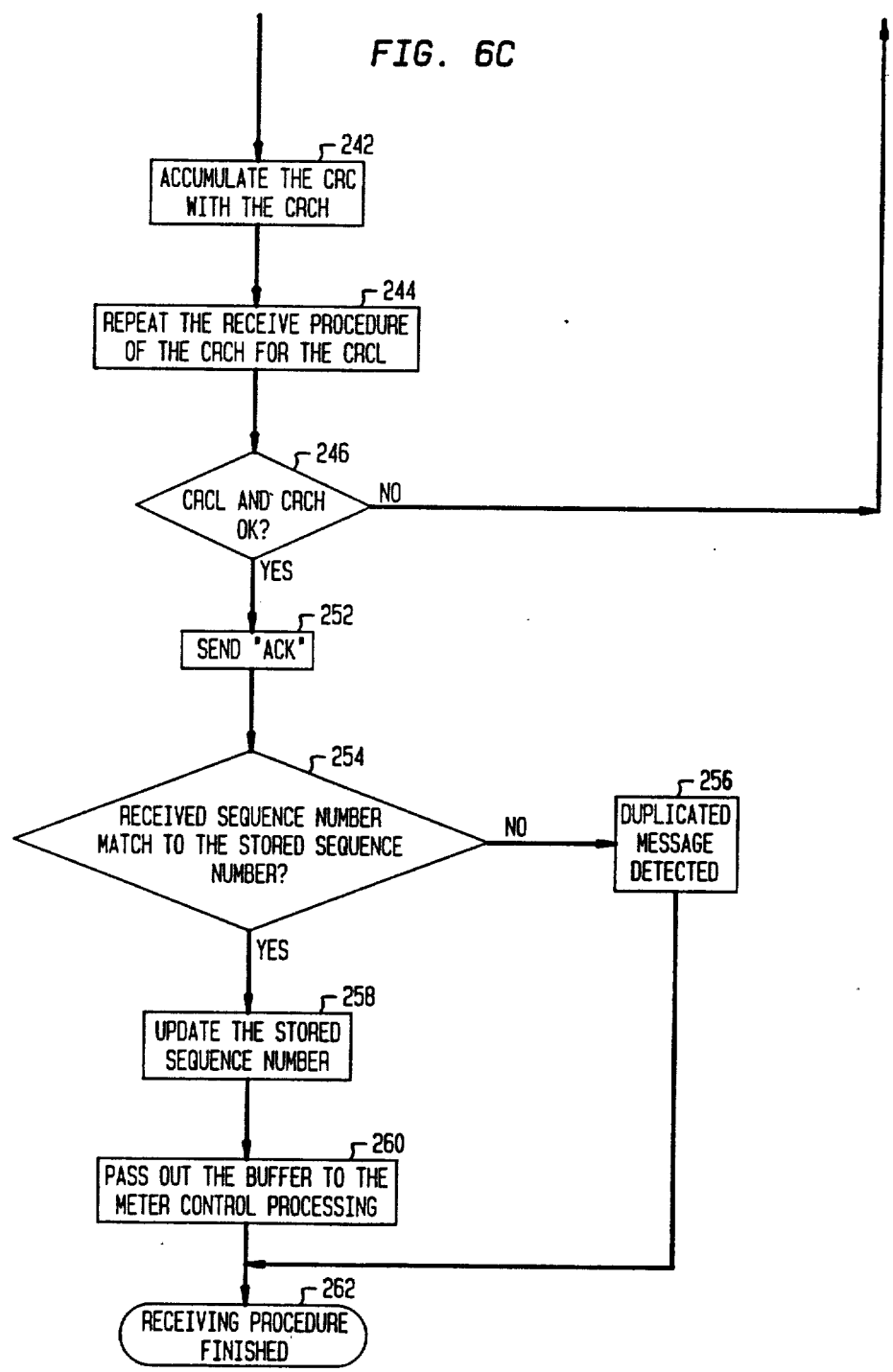

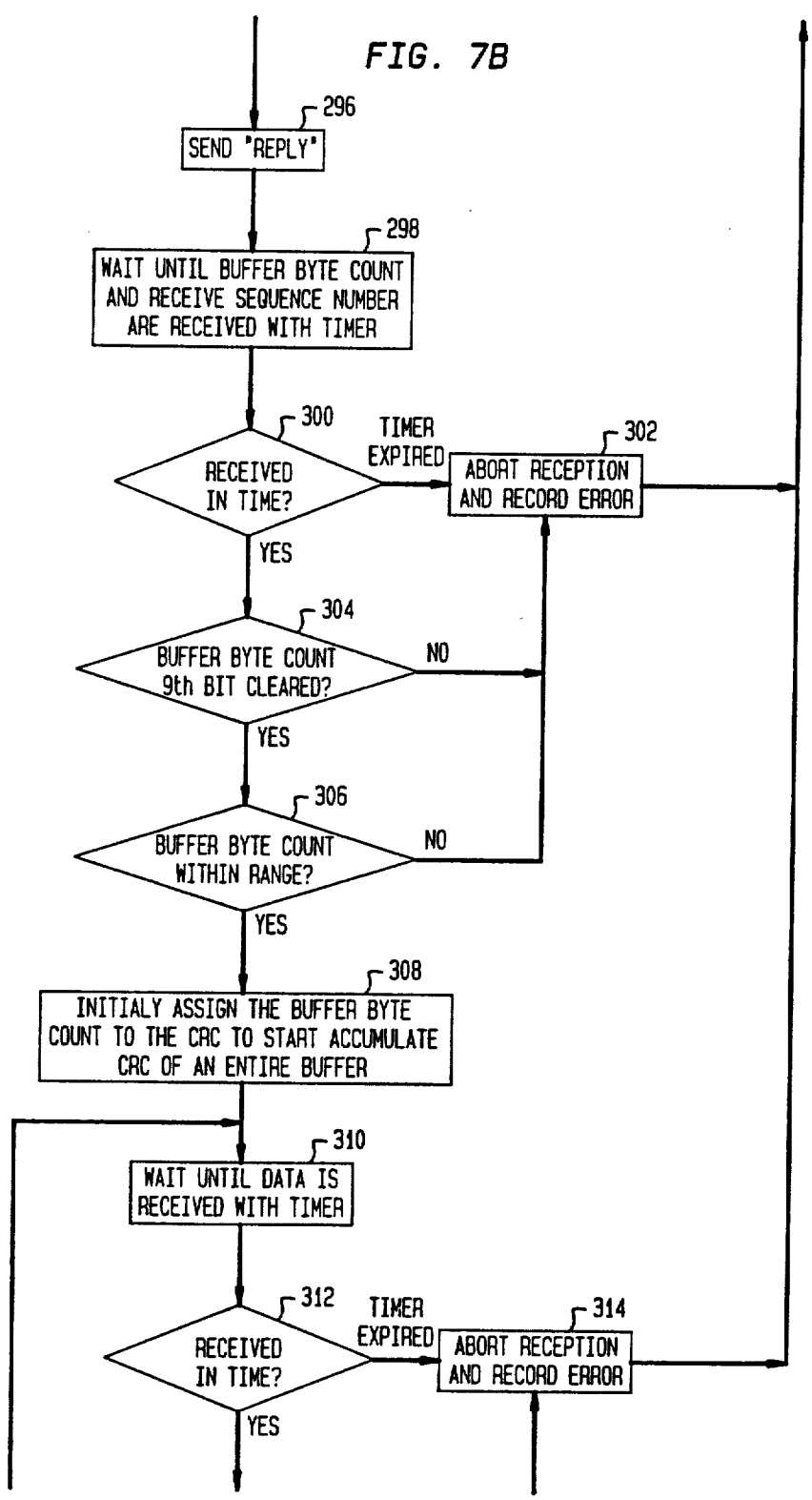

NODE 2 TRANSMIT PROCEDURE

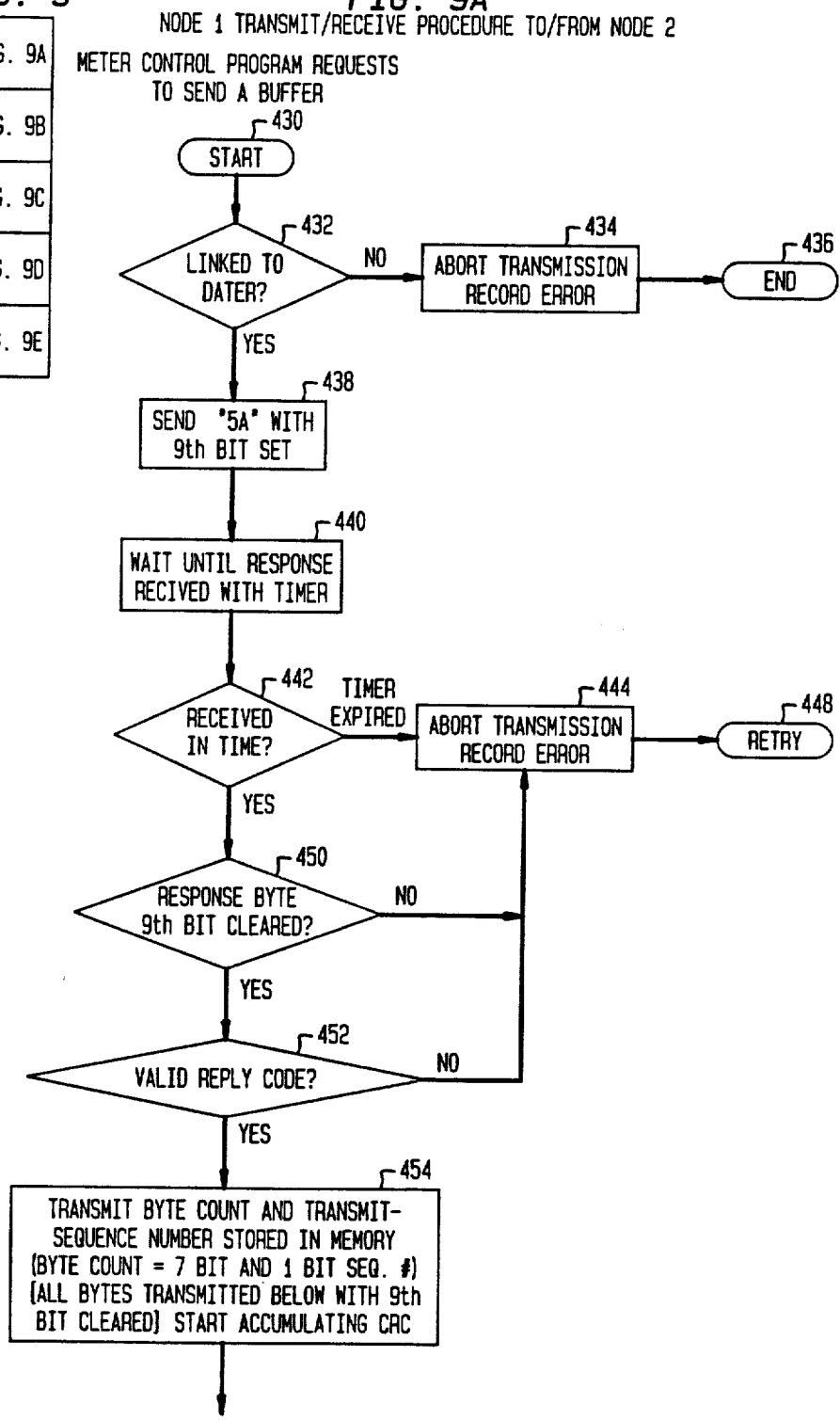

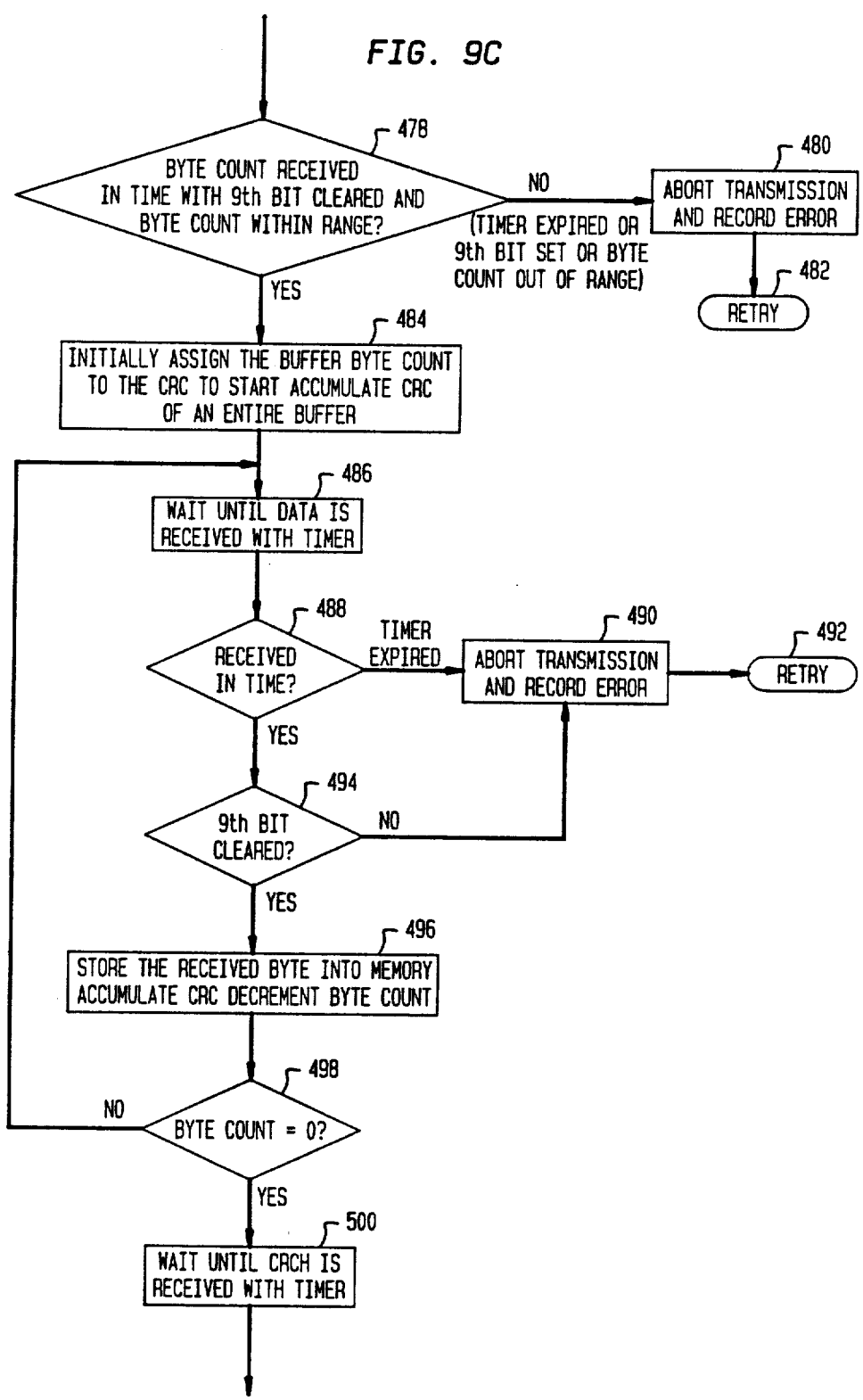

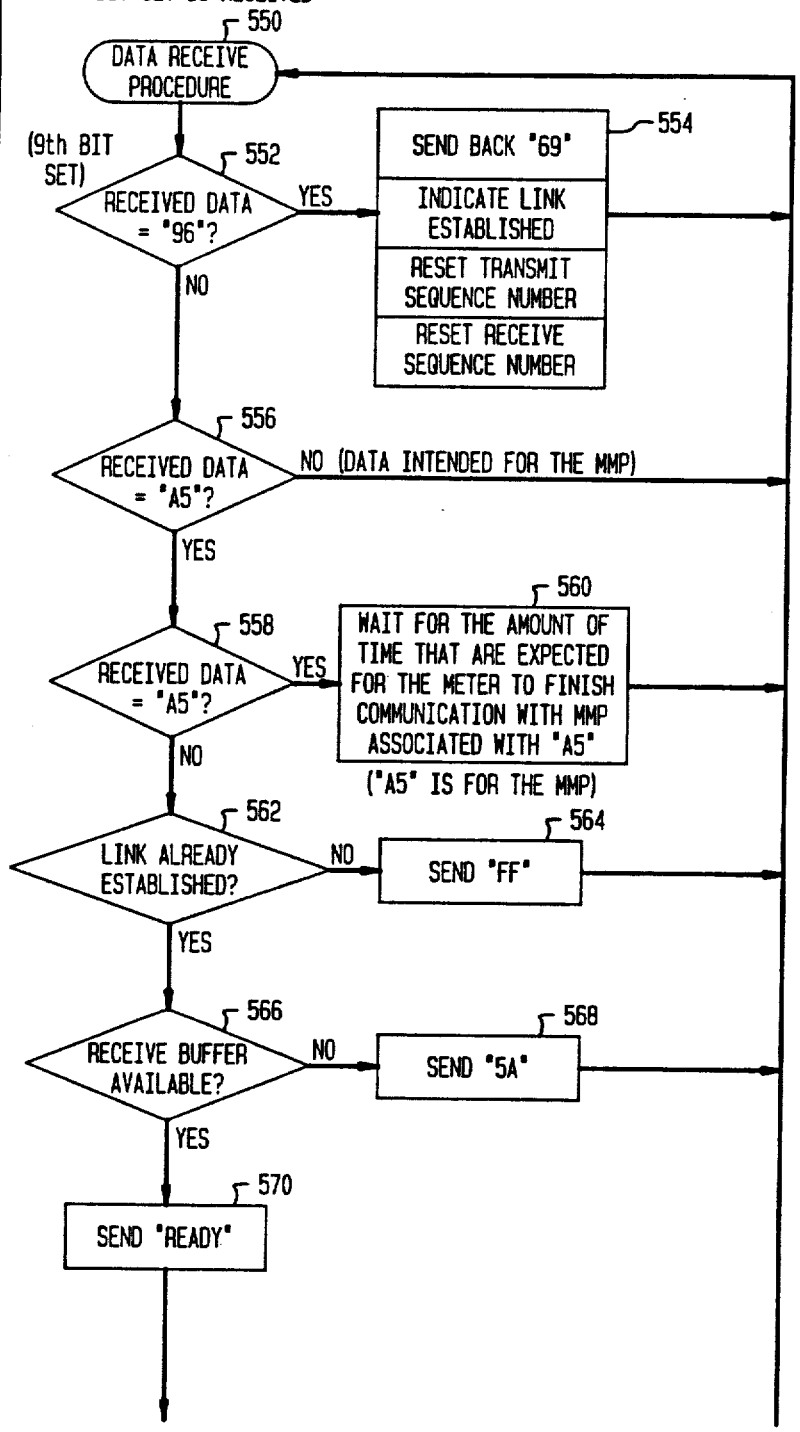

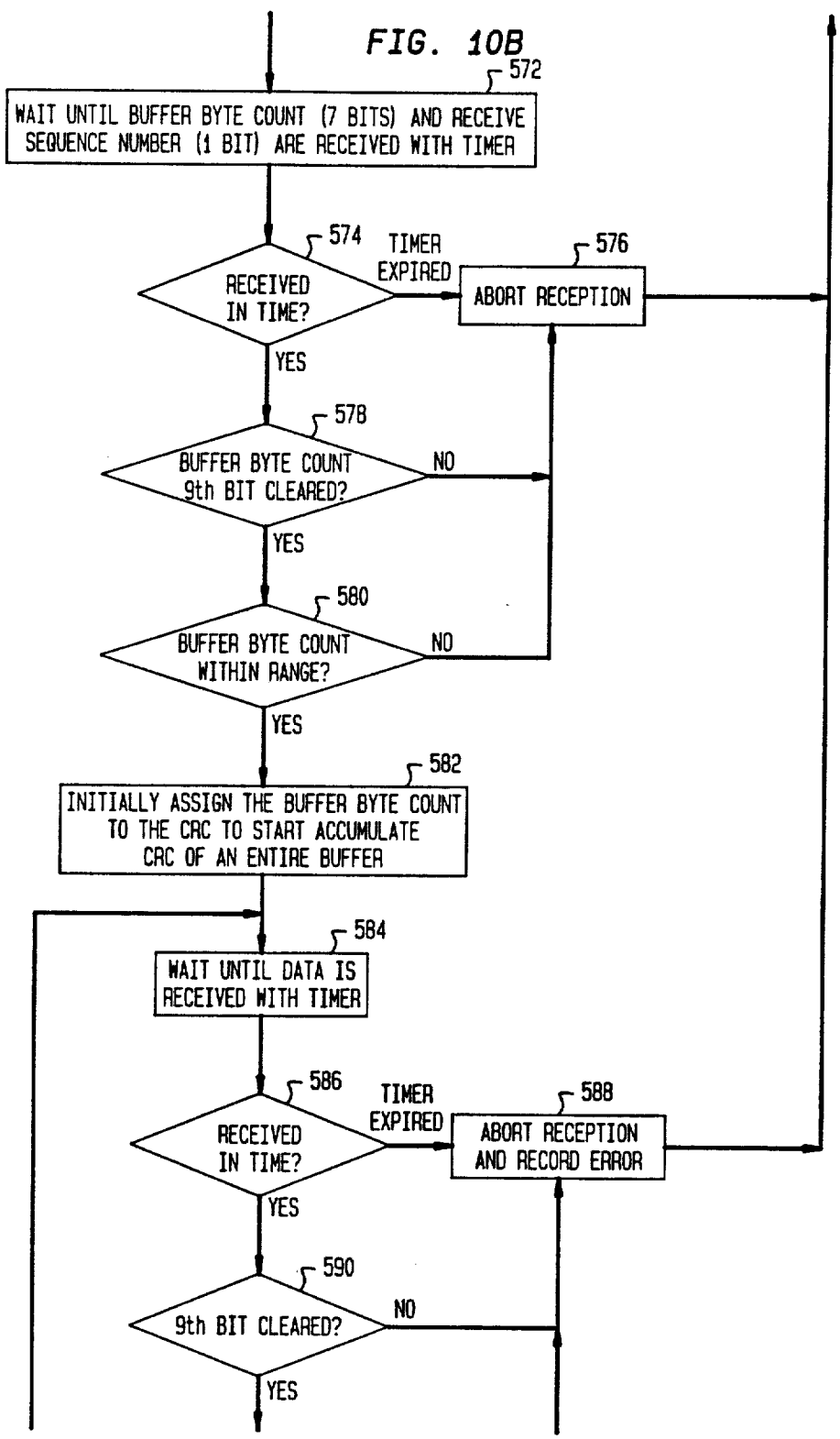

COMMUNICATION PROTOCOL FOR A THREE NODES SYSTEM HAVING DEDICATED CONNECTIONS AND BIT INDICATING FUNCTION OF EXCHANGED MESSAGE

BACKGROUND OF THE INVENTION

This invention relates to the field of communication protocol for facilitating communication between controllers of a nodal network suitable for real-time operations control.

Historically, controller communication networks have been organized in star, multi-drop, or ring configuration. In a star configuration, one controller, or "node", forms a center and acts as the network "master". Separate line extend from this master to all the other "slave" nodes. As a result, messages generated by the sending slave node and intended for another slave node must be received by and transmitted to the intended receiving slave node by the master node. Because all inter-nodal communications must go through the master node, thereby consuming master node processor time, star network configurations are suited for those applications which required limited inter-nodal communications of relatively short data messages, which is not a characteristic of networks designed to control real-time interdependent machine operations. Thus, protocols designed to operate within star configured networks are more concerned with data message compression and complete data messaging, and are not well suited where frequent communication inter-nodal communication is expected or where the inter-nodal communication is expected to comprise "statement-response" messages or where large data messages are anticipated.

In the multi-drop network, a communication line, or data trunk, connects to a plurality of nodes by drop lines. A single node may act as a network master, mastership may be transferred between nodes after a polling process determines which node requires control of the network. Also, in some multi-drop networks, contingent schemes are employed to avoid the need for identifying a master. In such systems, each node contends for assess to the data trunk, and when assess is obtained, a message may be sent directly to any other node in the network. Special hardware is required to detect collision of message on the data trunk. Protocols designed for multi-drop configuration must conform to the requirement of collision detection hardware and bus availability schemes. In addition, the protocol best serves the multi-drop network when the data messages count is somewhat larger as contracted with the star network configuration, however, inter-nodal communication should be infrequent. Again, multi-drop network communication protocols are not particularly well suited for high speed "statement-response" messaging.

With respect to a ring configuration, each node is linked to two other nodes in a loop arrangement. Messages are removed from the ring by the destination node, or if the message travels full circle, it is removed by the original node. Because all communication is lost if any node fails in the ring network, it is common practice to revive a second, or redundant ring which is switched into operation if the primary ring fails. Contrasted with the star and multi-drop networks, the ring configuration is better suited for the communication of high count data messages. However, because of its configuration, it is not particularly suited of high speed "statement-response" messaging. Resultantly, protocols primarily intended for employment in ring networks are designed to promote source and destination nodal identity, and data message delivery.

SUMMARY OF THE INVENTION

It is an object of the present invention to present a protocol which is particularly suited for network communications where high-speed "statement-response" messaging is required. It is a further objective to present a protocol which is tuned to minimize response messaging, nodal processor overhead and communication time. It is a still further objective of the invention to present a protocol which can be software implemented.

It is another objective of the present invention to present a communication configuration and protocol well suited for control in real-time of high speed machine operation, particularly, where such operations must be controlled synchronously. Synchronous controlled operation requires frequent inter-nodal communication of large data transmissions. A complimenting objective of the present invention is providing a protocol having means for message error recognition and thereupon message retransmission, i.e., high message reliability. A still further objective of the present invention is to present within a multi-drop communication configuration, a contention scheme which consumes minimum processor overhead nor requires the addition of additional hardware to the system.

The system is comprised of three-node controllers. Each controller can be responsible for controlling the real-time operation of a plurality of machine functions in a synchronous manner and the system requires such cross nodal functions to be performed in synchronous manner. Each controller is microprocessor based having on board communication buffers and programmable communication ports, i.e., receive port and transmit port.

Each controller in the preferred embodiment includes an on board Intel 8031 microprocessor with UART (Universal Asynchronized Receive-Transmit). The microprocessor/controller includes a transmit and a receive communication port. The transmit port of the first node is in line communication with the receive port of the second node and third node. The receive port of the first node is in line communication with the transmit port of the third node and the second node. This communication configuration allows two nodes to transmit data at the same time. Contention problems are resolved by prioritizing the Node Transmission. The line connection between the nodes does not permit direct communication between the second and third nodes.

The protocol is tuned to minimize response messaging, processor overhead and communication time by (a) communication control data is protected by redundant bytes which promotes accurate messaging, (b) the text portion of a message is transparent to the eight-byte microsystem, i.e., 8-bit character instead of ASCII code, (c) transmission errors are detected by redundant bytes, e.g., cyclic redundant check, (d) a protocol related message is always acknowledged, (e) the protocol is to be able to recover communication with the data if a message exchange is not received, or when the transmission of a series of data is aborted, (f) message sequencing is introduced to detect the duplication: for this purpose, send and receive sequence numbers are independently maintained at each communication node.

Nodes 1 and 2 are generally of equal status, while Node 3 is configured generally as a slave to Node 1. When either the Node 2 or Node 3 transmits, its destination is always the Node 1. Each node includes a receiving and transmit buffer. There are no electrical circuits between the transmit/receive pins of the controllers. The availability of the receiving buffer of the destination node is checked by the sending or source node prior to transmitting a message. The maximum number of data bytes which can be transmitted at one time is 32 bytes between the Node 2 and Node 1, and 8 bytes between the Node 1 and Node 3, excluding the byte count.

BRIEF DESCRIPTION OF THE DRAWINGS

FIGS. 5, 5a, 5b, and 5c are schematics of the nodes transmit communication logic.

FIGS. 6, 6a, 6b and 6c are schematics of the Node 1 receive communication logic.

FIGS. 7, 7a, 7b, 7c and 7d are schematics of the Node 2 receive communication logic.

FIGS. 9, 9a, 9b, 9c, 9d and 9e are schematics of the Node 1 to Node 3 transmit/receive communication logic.

FIG. 9f is a schematic of the Node 3 retry communication logic.

FIGS 10, 10a, 10b, 10c, 10d, and 10e are schematics of the Node 3 receive/transmit communication logic.

DETAILED DESCRIPTION OF THE PREFERRED EMBODIMENT

Figure 1:
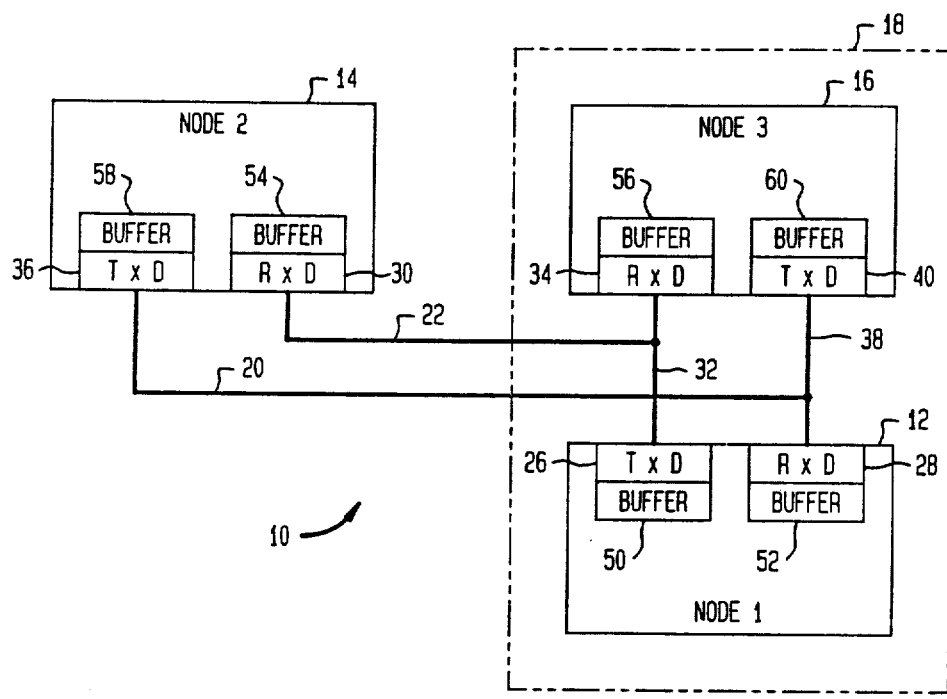
FIG. 1 is a schematic of a three node system in accordance with the present invention.

Referring to FIG. 1, a control system, generally indicated as 10, includes Nodes 1, 2 and 3, generally indicated as 12, 14 and 16, respectively. Node 2 is is in communication with Nodes 1 and 3, through lines 20 and 22. Each Node, 1, 2 and 3, includes an Intel 8031 UART microprocessor based controller which microprocessor contains onboard hardware functions to implement the communication protocol hereafter described. Refer to Intel Corporation, Santa Clara, Calif., Publication No. ISBN1-55512-072-5, entitled, "Embedded Controller Handbook", Vol. 1, 1988.

The Intel 8031 microprocessor includes a transmit (TXD) pins and receive (RXD) pins. The nodal connection institutes a multi-drop full duplexing communication scheme. Node 1 acts as the multi-drop host. The Node 1 TDX pin 26 is connected to the Node 2 RXD pin 30 through lines 22 and 32 and to the Node 3 RXD pin 34 through line 32. The Node 1 RXD pin 28 is connected to the Node 2 TXD pin 36 through lines 20 and 38 and the Node 3 TXD pin 40 through line 38. The configuration does not allow direct communication between the Nodes 2 and 3. Each pin 26, 28, 30, 34, 36 and 40 has associated therewith a respective buffer 50, 52, 54, 56, 58 or 60.

When Node 1 transmits, both Node 2 and Node 3 receive the signal with only the intended receiver responding to the addressed signal in a manner hereafter described. It is possible for both Nodes 2 and 3 to simultaneously transmit to the host Node 1. The contention problem thereby caused is resolved in the protocol as hereafter described. It is noted that the host Node 1 can simultaneously receive and transmit.

Figure 2:
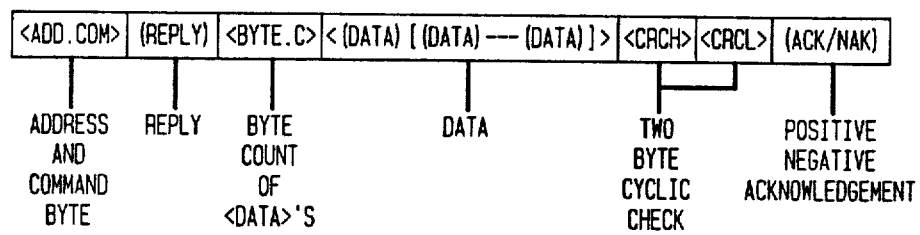
FIG. 2 is a schematic of first protocol message format in accordance with the present invention.
Figure 3:
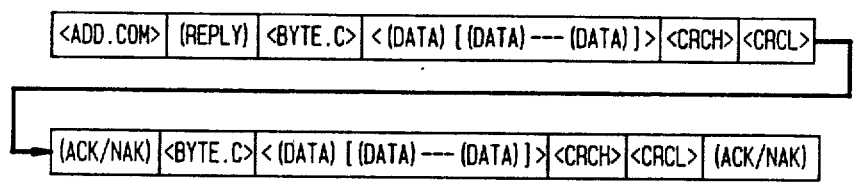
FIG. 3 is a schematic of a second protocol message format in accordance with the present invention.

Referring to FIGS. 1, 2, and 3, the Intel 8031 microprocessor UART contains hardware functions to implement the hereafter described protocol. The 8031 UART operates at 375K bytes per second (bps) at 12 megahertz crystal clock frequency. A one byte transmission consists of 11 bits: 1 start bit and 8 data bits, one programmable bit, and 1 stop bit. The programmable byte is to be used to signal the start of a message frame. At receiving, if the programmable bit is not set, the 8031 UART can enter a sleep mode requiring no CPU overhead due to communication. One byte transmission (8 bit data plus 3 bit overhead) takes 29.2 microseconds at 375K bps, that is, 29.2 usec. is available after loading the UART transmission register. This period is utilized to implement a software based message level communication protocol. Within the preferred Nodal environment, propagation delay and turnaround delay (switching from transmission to receive, vice-versa are negligible within the definition of the protocol).

Referring to FIG. 2, all the data defined in the message format will appear on the physical communication line, 20, 22,32 and 38 as a signal. The general form of message format includes an address-command byte <ADD.COM> which has a one byte field. The address-command byte <ADD.COM> is sent from the source Node and is followed by a Reply (REPLY) from the destination Node 1, 2 or 3, i.e., handshake. Following a successful handshake, the source Node transmits a data byte count <BYTE.C> followed by the data byte file [<data>—<data>] to the destination Node. The source Node then transmits a two byte cyclic redundancy check, cyclic redundancy check high <CRCH> and cyclic redundancy check low <CRCL>, which covers from and includes the byte count <BYTE.C>. The destination node then transmits a positive/negative acknowledgment for the data integrity after performing an error check. Error checking for the data message is achieved by comparing the received data with stored and predefined values in a receiving node.

The 9th bit of the Intel 8031 UART is used to distinguish the address byte <ADD.COM> from other bytes. All other bytes in the above format are sent with the 9th bit cleared. At a receiving node, software instructions can be set to allow a processor receive-interrupt only when the 9th bit is set. Whenever the 9th bit is set, the receiving sequence is restarted.

If a negative acknowledgment (ACK/NAK) is transmitted by the destination node, the message is retransmitted by the source node. Message sequencing is used to detect a duplicated message, i.e., an identical message is transmitted more than once upon detecting an error condition. When a duplication is detected, the duplicated message is discarded. For example, Node 1 transmits a message and Node 2 received it correctly, however the acknowledgment <ACK> is not delivered from the Node 2 to the Node 1. The meter will then retransmit the same message, resulting in a duplicated message at Node 2.

In general, a transmission or sending node sends a sequence number as part of the byte count <BYTE.C> to a receiving node. The receiving node updates the receive sequence number and sends the updated sequence number to the transmitting node as part of the acknowledgement <ACK>, finishing one cycle. At the end of each cycle, the transmit sequence number and the receive sequence number should be the same. Node 1 maintains one pair of receive-transmit sequence number for Node 2, and another pair for Node 3. Node 2 maintains one pair of receive-transmit sequence number for Node 1. Node 3 maintains one pair of receive-transmit sequence number for Node 1.

Node 1 and Node 2 are allowed in the protocol to initiate transmission. This may cause contention when the two nodes try to transmit simultaneously. Contention is resolved by configuring Node 1 as a host node in the full-duplex configuration. That is, transmissions from Node 1 are given a high priority such that should the other nodes simultaneously transmit their transmission is put in an interrupt mode. This contention approach eliminates the need for polling, greatly improving response times.

Node 1 can transmit at will. It first transmits the address-command <ADD.COM> expecting a reply response (REPLY) within a minimum of 30 microseconds and a maximum of up to 500 micro-seconds from Node 2 (mailing machine) and 30 to 150 micro-seconds from Node 3. The Node 2 receive-interrupt UART function should not be disabled for more than 450 micro-seconds, and the Node 3 receive-interrupt UART function should not be disabled for more than 100 micro-seconds. Preferably, a receive-interrupt should be enabled at all times.

The byte count <BYTE.C>, data byte <data> and CRC's <CRCH>, and <CRCL>, respectively, are transmitted at about 35 micro-second intervals. The meter expects to receive acknowledgement (ACK/NAK) within 30 to 50 micro-seconds after the last data byte <data> is transmitted.

Node 2 has low priority in resolving the contention. It can transmit from its buffer at will. However, if Node 1 transmits at the same time, the Node 2 will detect the contention and give a priority to the Node 1.

Node 2 first transmits the address-command <ADD.COM> expecting a reply response (REPLY) from Node 1 within 30 microseconds to 500 micro-seconds. During the waiting period, an address-command byte <ADD.COM> can be received instead of (REPLY). If the (REPLY) is received, Node 2 has a right of way to transmit to the Node 1. If Node 2 knows that Node 1 is busy and cannot receive a message, Node 2 should not attempt to transmit for that busy period.

All attempts which do not follow the strict procedure of the protocol will result in a communication error. Pursuant to error detection, message retry is commenced. If all retries fail, system failure is declared.

Node 2 may receive a address-command <ADD.COM> when it is expecting a response, (REPLY) resulting in system contention. To resolve the contention, Node 2 aborts the transmission and switches to receive mode. After the contention is resolved, the mode of operation is an alternating two way communication, i.e. Node 2 is either in transmit mode or in receive mode.

The byte count <BYTE.C>, data message <data> and cyclic checks <CRCH> and <CRCL> are transmitted in 30 to 35 micro-seconds intervals. Node 2 expects an acknowledgement (ACK/NAK) within 30 to 50 micro-seconds after the last data message <data> is transmitted.

In the preferred embodiment, Node 3 never initiates transmission. In the preferred embodiment, the Node 2 transmit-buffer 60 must be ready within 150 micro-seconds after it receives a start of a message from Node 1. In other words, Node 3 must process the receive buffer 56 in less than 150 micro-seconds. If the message from the meter has errors, the Node 3 responds with a negative acknowledgement <NAK>, which is the end of message exchange. Otherwise, Node 3 will respond with the acknowledgement <ACK>. The response should be transmitted within the next 150 micro-seconds.

As aforenoted, Node 2 will abort transmission to resolve contention with Node 1. Node 3 can receive data which is intended for the Node 2 and, conversely, Node 2 can receive data for the Node 3 from Node 1. In order to discriminate between the intended message recipient, codes are defined which are unique to each Nodes 2 and 3. When errors occur such as CRC errors indicating bad data, the data should be discarded. All this unwanted data must be filtered out.

When there is no message contention, Node 2 initiates a transmission to Node 1 by transmitting the Node 2 address-command <ADD.COM> byte. When the address-command <ADD.COM> byte is received, Node 1 should send a reply within 450 (maximum) micro-seconds and proceed to receive data from Node 2. The transmission time interval is guaranteed by the Intel 8031 hardware, but the time to receive a data byte is not. Therefore, reception of a byte is always timed out in 50 micro-seconds using a counter. At the same time, whenever data is received with the 9th bit set, the reception procedure is restarted. Should the 50 micro-seconds timer expire, Node 1 aborts reception.

The reception of data from Node 3 to Node 1 always follows uninterrupted, the transmission of data from Node 1 to Node 2. The processing time of the receive buffer by Node 3 is between 0 to 150 micro-seconds.

When Node 2 receives the address-command <ADD.COM> destined to Node 3, it simply reads the data and discards it. It then programs the UART so that the receive-interrupt is enabled when a data is received with the 9th bit set. Since all data bytes other than the address-command <ADD.COM> have the 9th bit cleared, Node 2 will not be aware of data traffic between Node 1 and Node 3.

The waiting timeout period between receiving data bytes is 50 micro-seconds. Node 2 aborts reception after the waiting period has expired and a data byte has not been reserved. Whenever data is received with the 9th bit set, the reception procedure is restarted.

When Node 3 receives the address-command <ADD.COM> destined to Node 2, it simply reads the data and discards it. It then programs its UART so that the receive-interrupt is enabled when a data is received with the 9th bit set. Since all data bytes other than the <ADD.COM> have the 9th bit cleared, Node 3 will not be aware of data traffic between Node 1 and Node 2.

Again, the waiting timeout period between receiving data bytes is 50 micro-seconds. Node 3 aborts reception after the waiting period has expired and a data byte has not been received. Whenever a data is received with the 9th bit set, the reception procedure is restarted. The only byte in a message exchange where the 9th bit is set, is the first byte of message exchange.

The protocol related control bytes are: address-command <ADD.COM>, reply (REPLY), and positive/negative acknowledgement <ACK/NAK>. The codes for this data are defined in such a way that at least 4 bits are different, and those 4 bits are redundant. The detection of errors is accomplished by comparing the expected value with the received value when a certain control data is defined within the context of a string of received bytes.

Error detection for meaningful data is based upon the complement arithmetic checksum proposed by the John G. Fletcher. Refer to the article "An Arithmetic Checksum for Serial Transmission", John G. Fletcher, IEEE TRANSACTIONS ON COMMUNICATION, VOL. COM-30, NO. 1, JANUARY, 1982.

The responsibility of error recovery is always at the transmitting node. The receiving end never requests a transmission. When a receive node detects an error in the address-command <ADD.COM>, it sends back an error message and aborts the receiving procedure. When a receiving node detects and CRC error, it sends a negative acknowledgement <NAK>. If any data byte with the 9th bit set is received, the receiving procedure is restarted. A runaway transmission is ignored, because the 9th bit is not set for any data except the address-command <ADD.COM>. Aborted transmission of a series of data which is less than the byte count are detected after the time-out period, and the receiving is aborted.

The transmitter detects an error when an error message is received for the address-command <ADD.COM> or when negative acknowledgement <NAK> is received. When an error is detected, the transmitter waits at least 2 milliseconds, then retransmits up to 3 times. If these rapid retries fail, then it tries up to 3 times using the time interval of 250 milliseconds. If all tries fails, then it is suggested that an application program try to retransmit up to 3 times every 2 seconds.

SYSTEM OPERATION

Figures 4, 4A:
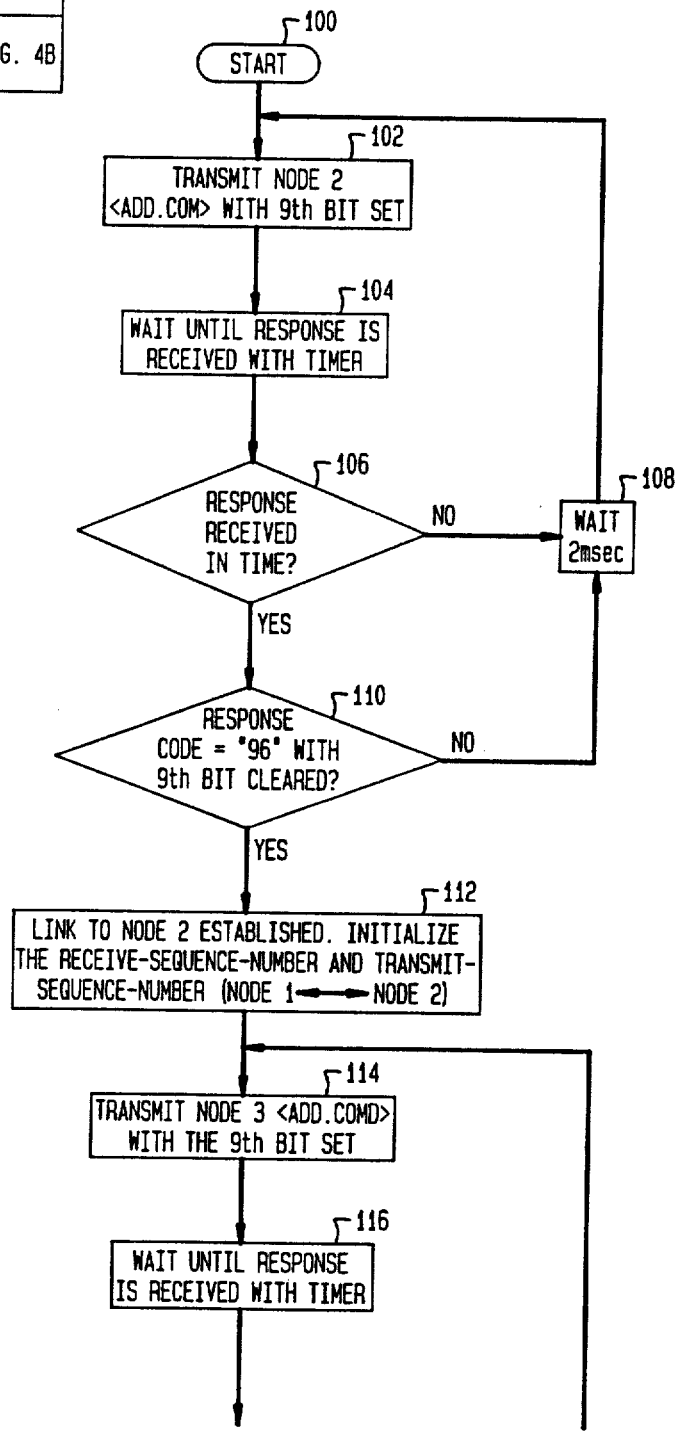
FIGS. 4, 4a and 4b are schematics of the communication nodal linking logic in accordance with the present invention.
Figure 4B:
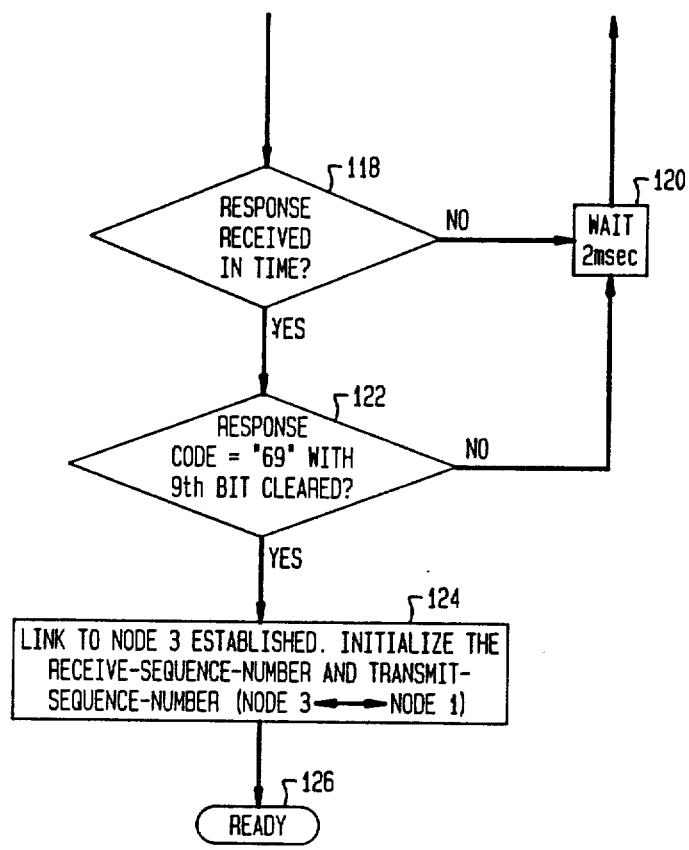

Referring now to FIGS. 4a and 4b, Node 1 can transmit at well. Upon powering up the system, the software commands initiate a start sequence at logic block 100. Upon initiation of the start sequence, Node 1 under software instruction transmits a address-command <ADD.COM> Code 69 at logic block 102 which is directed to Node 2. Subsequently thereto, Node 1 stands ready at logic block 104 to receive a response from Node 2 from between 30 to 500 micro-seconds. Subsequently thereto at logic block 106, a check is performed to ascertain whether the response has been received in time. If the response has not been received in time, Node 1 waits 2 micro-seconds at logic block 108 and then proceeds back to the initial point of the start routine at logic block 102. If the response is received in time, the communication logic then proceeds to logic block 110 to establish whether communication has been linked by receiving a response code 96 with the 9th bit cleared. If an improper code has not been received or the 9th bit is not cleared, the communication logic then proceeds to logic block 108 and waits 2 micro-seconds and then again initiates the start sequence at logic block 102.

If the proper response has been received at logic block 110, the communication logic proceeds to logic block 112 whereupon initialization of the receive sequence number and transmits sequence number is performed. Thereafter, a transmit Node 3 address-command <ADD.COM> with the 9th bit set is sent to Node 3. In similar fashion, the Node 1 communication logic is instructed to wait for the response from Node 3 for a period of approximately 30 to 150 micro-seconds. The response received is checked at logic block 118 to see if it is received in time, if not, the communication logic proceeds to logic block 120 whereupon a 2 micro-second wait is performed and the system is returned to 114 to attempt to establish communication linking again in the afore defined sequence. If the response is received in time, the communication logic proceeds to logic block 122 whereupon the response code is checked to see if the proper response code (69) with the 9th bit cleared has been received. If an improper response code has been received or the 9th bit has not been cleared, the communication logic then proceeds again to logic block 120 for a 2 micro-second wait and then initiation of the linking sequence is re-performed at 114. If the proper code has been received and the 9th bit has been cleared, the communication logic of the meter then proceeds to logic block 124 whereupon Node 3 receive sequence number and transmit sequence numbers are initialized. Subsequent thereto, the communication logic proceeds to logic block 126 and stands ready for communication.

Figure 5B:
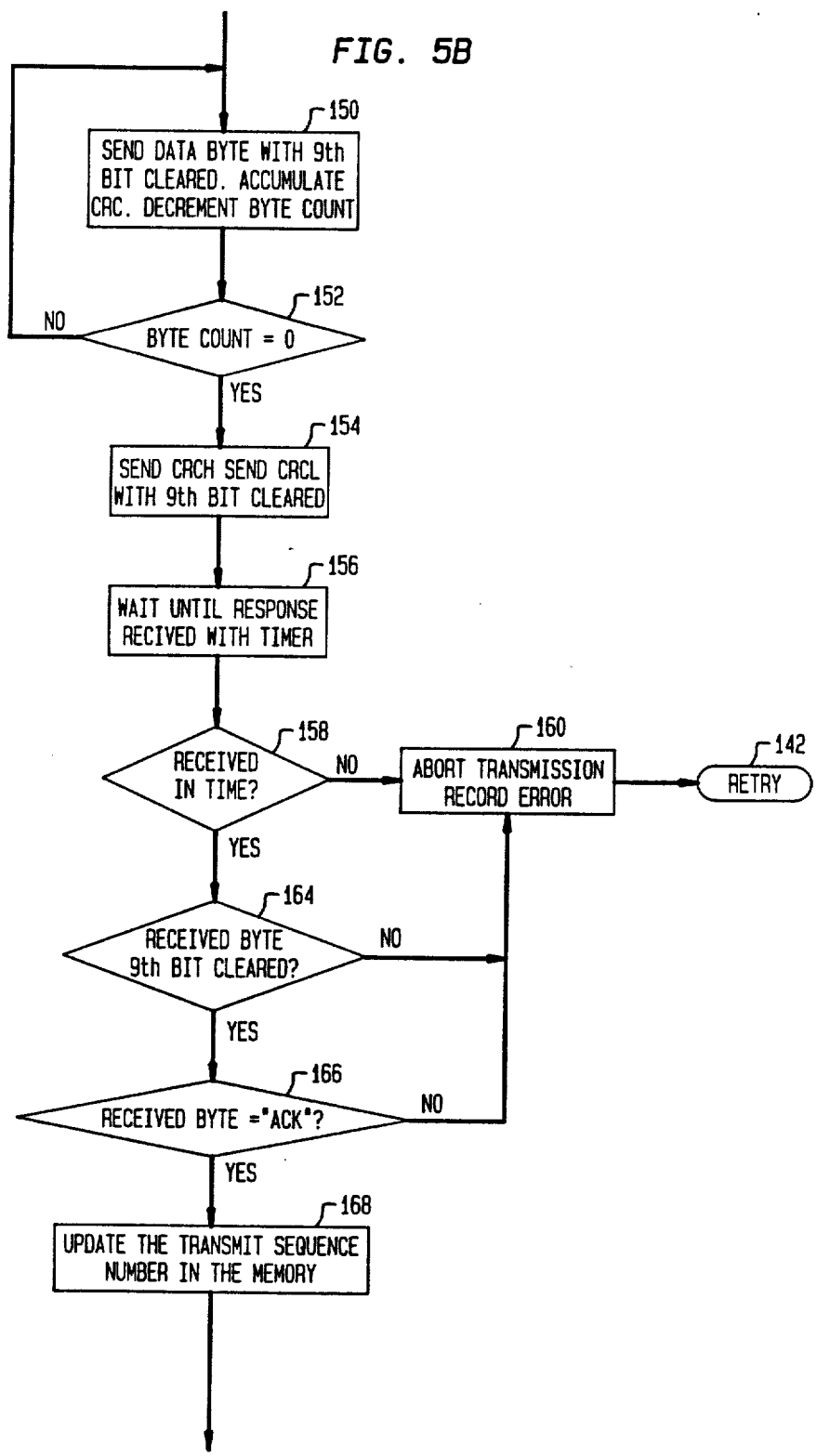
Figure 5C:
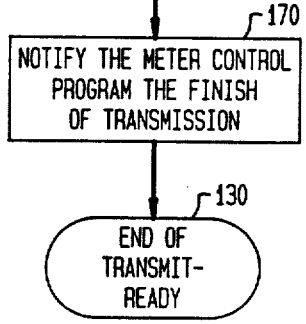

Referring to FIGS. 5a, 5b and 5c, should Node 1 control program request to send a buffered message to Node 2. At the ready illustrated at logic block 130, Node 1 then transmits the Node 2 address-command <ADD.COM> at logic block 134 with the 9th bit set. The communication logic is then instructed to wait for a response within a 30 to 500 micro-seconds time period. The communication logic then proceeds upon receipt of a response to logic block 138 whereupon a check is performed to see if the response was received in time. If the response was not received in time, that is the time expired, the communication logic is directed to abort the transmission and record the error at logic block 140. Thereafter, a retry routine is initiated at logic block 142. If the response has been received in time, the communication logic proceeds to logic block 144 whereupon a check is performed to see if the 9th bit is cleared. Again, if the 9th bit is not cleared, the communication logic is directed again to logic block 140 and therefrom to logic block 142 for a retry. If the 9th bit of the response byte is cleared, then the communication logic proceeds to logic block 146 whereupon a check is performed to see if a valid reply code has been received and if the receiving buffer of Node 2 is ready to receive information from Node 1. If a valid reply code has not been received, again the communication logic is directed to logic block 140 and therefrom to a retry routine at logic block 142. If a valid code has been received, then the communication logic proceeds to logic block 148 whereupon the byte count and sequence number are transmitted with the 9th bit cleared and the start accumulation for the CRC's performed. The communication logic then proceeds to logic block 150 whereupon data byte with the 9th bit cleared, is transmitted, followed by the accumulated CRC's using the data byte and the byte count is decremented. At this point, a loop is set where the send data byte proceeds until that byte count is decremented to zero. The byte count is checked at logic block 156. When the byte count has been decremented to zero, all data has been transmitted, the communication logic proceeds to logic block 154 whereupon then the CRCH and CRCL is sent and the 9th bit is again cleared. Subsequently thereto, at logic block 158, the communication logic waits for a response from the MMP within the 30 to 500 micro-seconds response. The communication logic proceeds to logic block 158 to check to see if the response has been received in time. If the response is not received in time, the communication logic proceeds to logic block 160 whereat an abort transmission is performed and the error recorded. The communication logic then proceeds to logic block 142 where the retry routine is initiated.

If a response is received in time, the communication logic proceeds from logic block 158 to logic block 164 where a check is performed to see if the 9th bit is cleared. If the 9th bit is not cleared, the communication routine proceeds to logic block 160 and therefrom to the retry routine logic block 142. If the 9th bit of the response has been cleared, the logic routine proceeds to logic 166 where a check is performed to see if the receive message contains an acknowledgement message, if not, the logic routine proceeds to logic block 160 and therefrom to logic block 142 for a retry. If an acknowledgement is received, then an update is performed of the transmit sequence number in the memory bit at logic block 168, therefrom the logic routines proceeds to logic block 170 whereupon a notification routine is performed to the Nodel control program that the transmission has been finished and logic is returned to the ready 130.

Figure 5D:
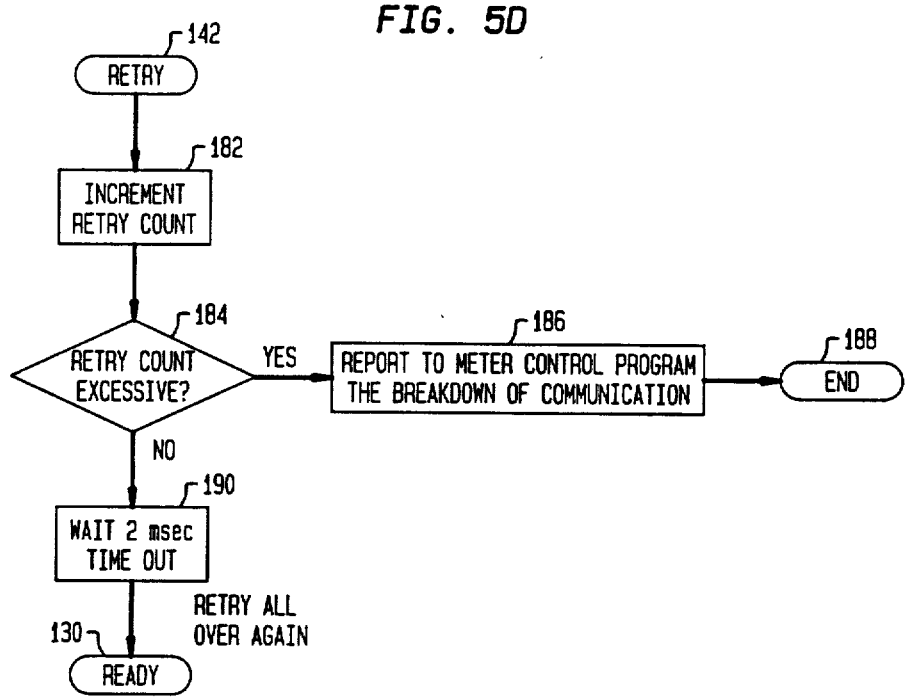
FIG. 5d is a schematic of the Node 1 transmission retry logic.

Referring to FIG. 5d, the retry routine 142 upon entry, proceeds to logic block 182 whereupon an increment of the retry counter is performed. The logic routine then proceeds to logic block 187 to determine whether the retry count exceeds the desired predetermined value. If the retry count is excessive, the routine proceeds to logic block 186 whereupon a report is generated to the Node 1 control program that a breakdown of communication has occurred and communication end at 188. If the retry count is not excessive, then the routine proceeds from logic block 184 to logic block 190 whereupon a 2 milli-second wait or time-out is performed and therefrom a return to the ready at 130 whereupon retransmission is attempted.

Figure 6B:
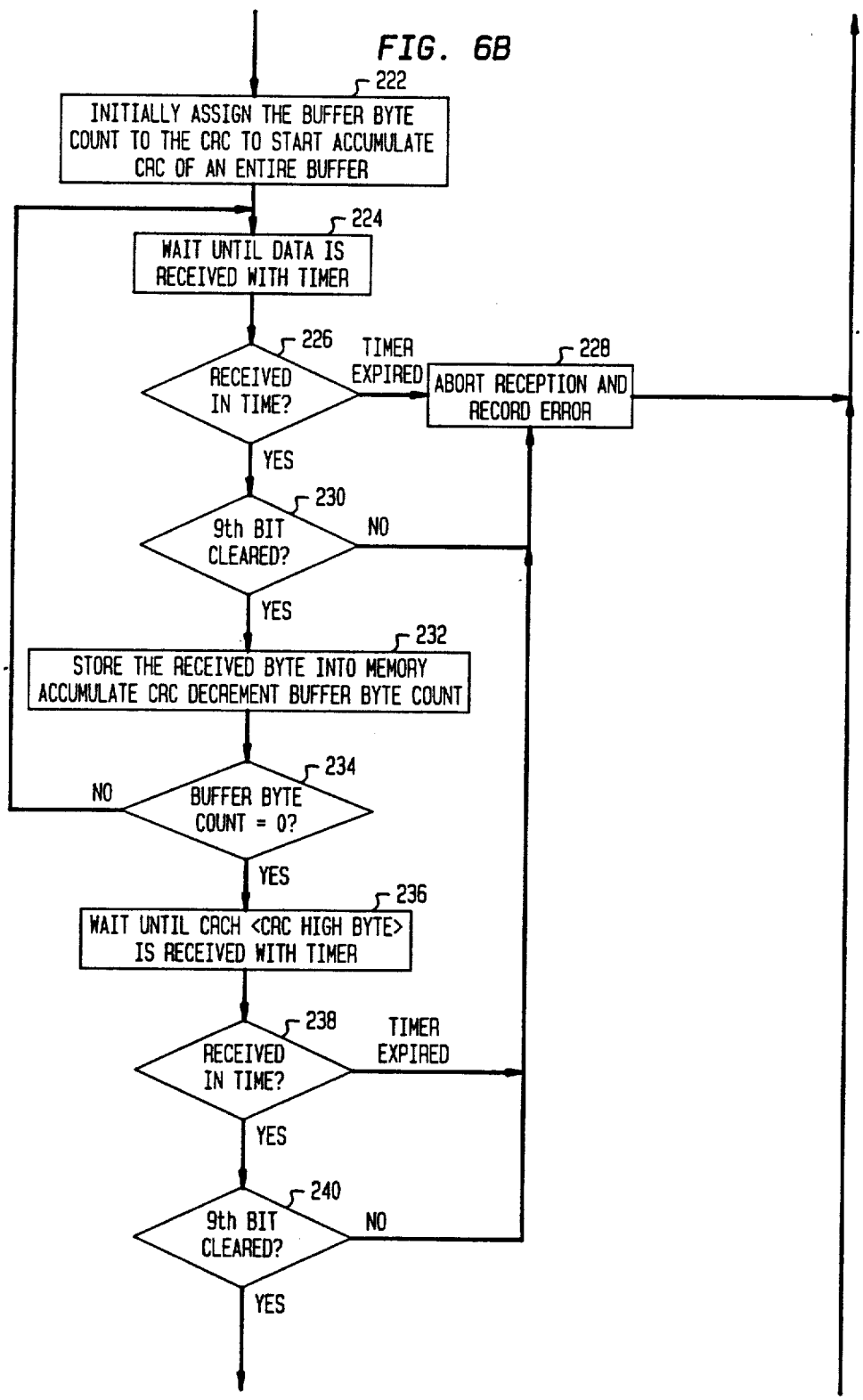
Figures 7, 7A:
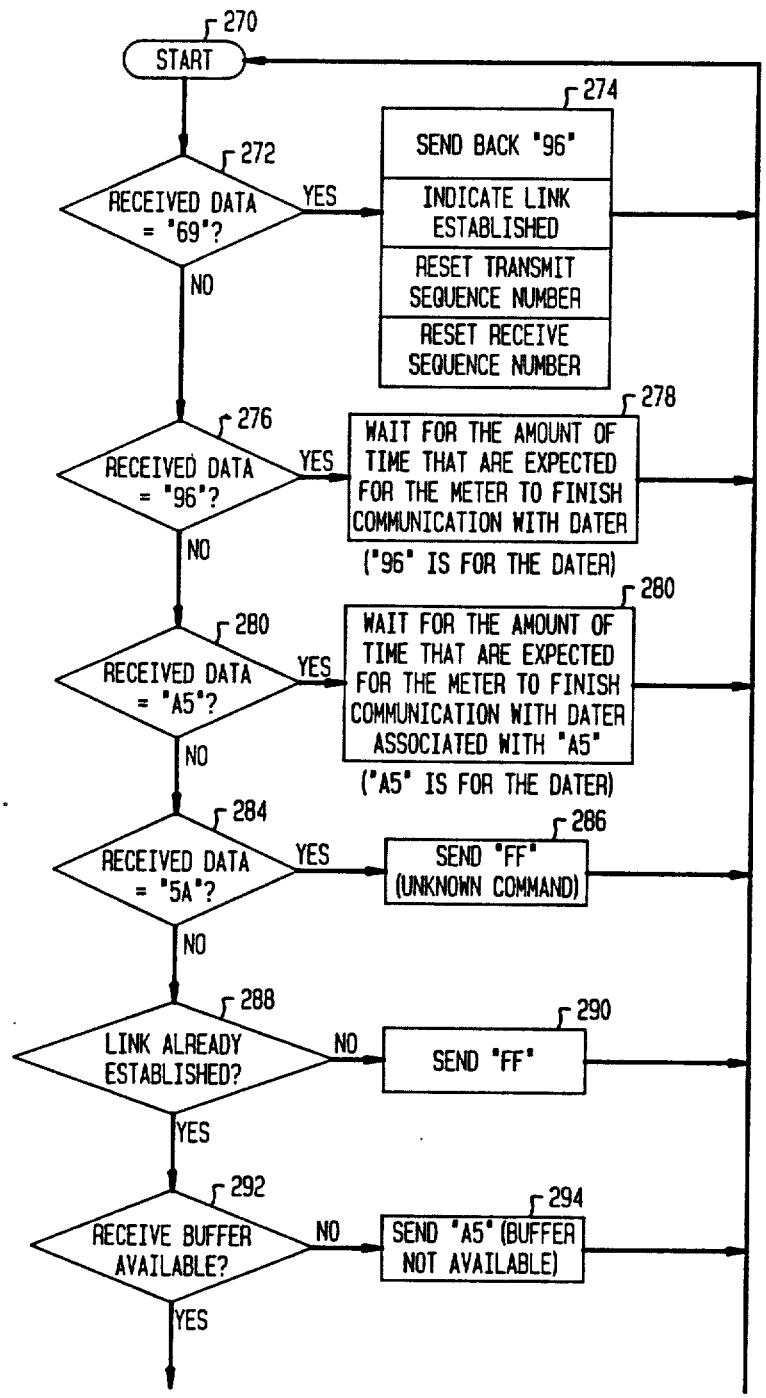
Figure 7C:
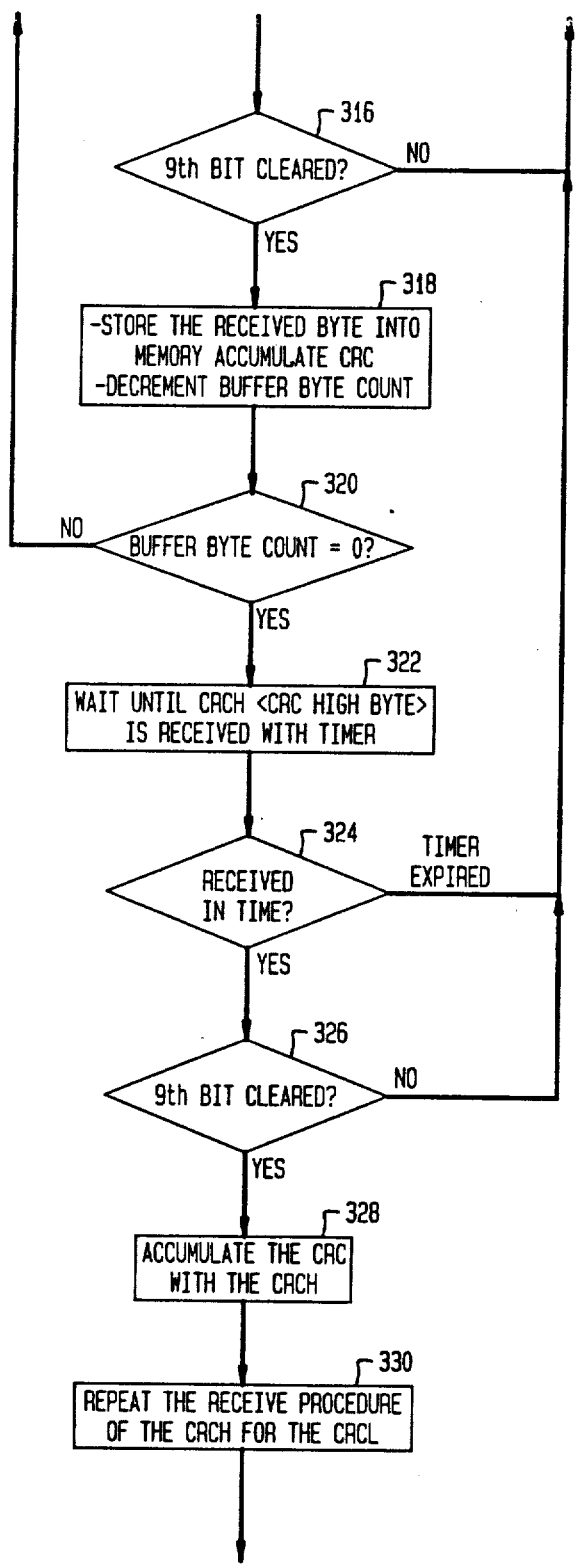
Figure 7D:
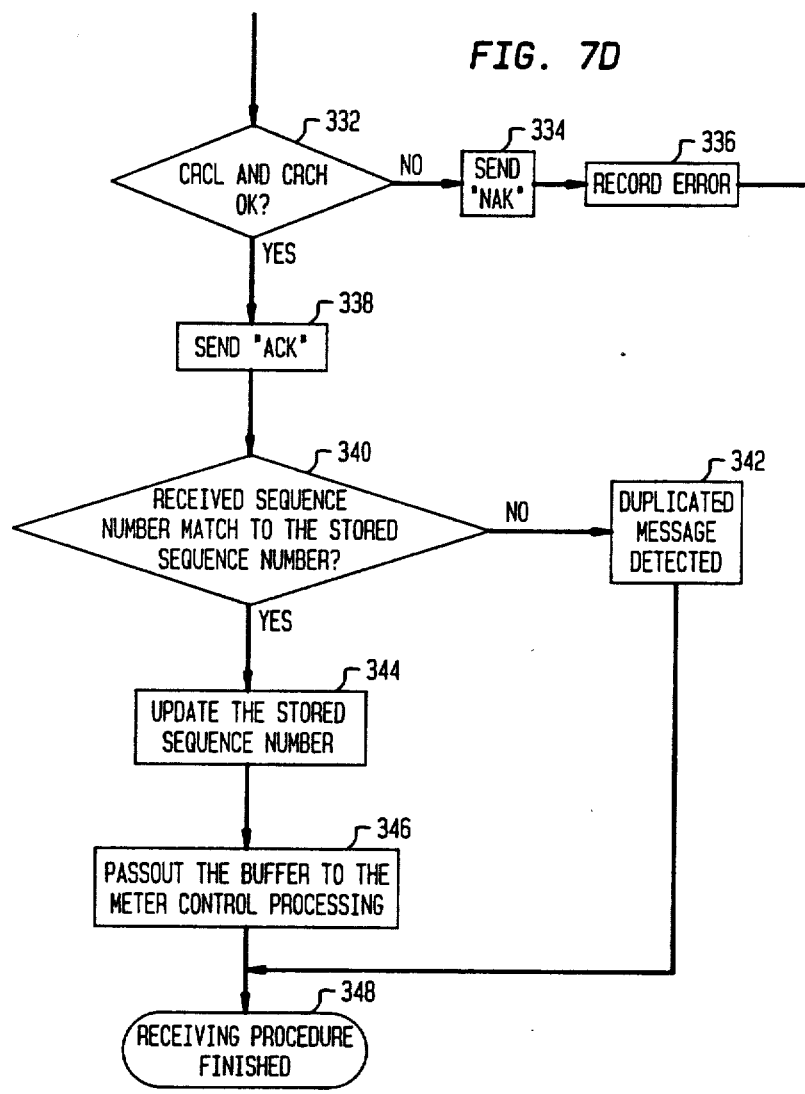

Referring to FIGS. 6a, 6b, and 6c, the Node 1 control program stands ready to receive any message with the 9th bit set at logic block 200. Any message received properly address-command to Node 1 is tested at logic block 202. If an invalid address-command <ADD.-COM> message is received, the communication logic proceeds to logic block 204 where an abort reception is performed and a error record made. The logic routine then proceeds back to logic block 200 to stand ready to receive a properly addressed message.

If a valid command-address message has been received, the routine proceeds from logic 202 to logic 206 where a test is performed to check to see if there is available space in Node 1 receive buffer 52. If there is not available space in the Node 1 receive buffer 52, Node 1 transmits at logic block 208 a message to the Node 2 identifying buffer not ready. The communication routine then proceeds to logic block 210 to record the error and then returns to the ready at 200 to stand ready for a retry by the Node 1. If the receiving buffer is available, the logic routine proceeds from logic block 206 to logic block 212 and transmits at logic block 212 a receive ready to Node 2. The communication logic of the meter then proceeds to logic block 214 whereupon a check is performed to see if a response is received in time. If the time has expired, the communication logic routine proceeds to logic block 216 where an abort routine is executed and the error recorded. The routine then proceeds to the ready at logic block 200. If the response is received in time at logic block 214, the communication logic proceeds to logic block 218 where a check is performed to see if the buffer byte count 9th bit is clear in the received message. If the 9th bit is not clear, the communication logic routine proceeds from logic block 218 to logic block 216 for an abort routine and then to the ready at logic block 200. If the 9th bit is cleared of the receive message, then the communication routine proceeds from logic block 218 to logic block 220 where a check of the buffer to see if the buffer byte count is within range. If the buffer count is not within range, again the routine proceeds to logic block 216 and therefrom to the ready at logic block 200. If the buffer byte count is within the proper range, then the routine proceeds from logic block 220 to logic block 222. At logic block 222, the buffer byte count is assigned to the initial CRC value. The routine then proceeds to logic block 224 whereupon a wait for data to be received is executed. The communication logic then proceeds from logic block 224 to logic block 226 whereupon a test is performed to see if the data has been received in time. If the data has not been received in time, that is the timer has expired, an abort reception and error recorded function is performed at logic block 228 and the routine then proceeds back to the ready position at logic block 200. If the data was received in time, a check is performed at logic block 230 to see if the 9th bit of the data byte is cleared. If the 9th bit is not cleared, the logic proceeds to logic block 228 and therefrom to ready logic block 220. If the 9th bit is clear, then the routine proceeds from logic block 230 to logic block 232 whereupon the received data is stored in the memory, the CRC accumulates using the received data and the byte count is decremented. Proceeding from logic block 232 to logic block 234, the buffer byte count is checked to see if it is equal to zero, if it is not, communication logic is returned to logic block 224 for the receipt of more data and the routine is looped therein from logic blocks 224, 226, 230 and 232 until the total data message is received and the byte count has been decremented to zero. Once the byte count has been decremented to zero, the routine proceeds from logic block 234 to 236 where a wait is performed to receive the CRCH byte count within a prescribed timer time. Pursuant to the wait, the routine proceeds from logic block 236 to logic block 238 where a check is performed to see if the CRCH byte count has been received in time. If the time is expired, the routine then proceeds from logic block 238 to logic block 228 and then to logic block 200. If the information has been received in time, that is the CRCH byte, the routine proceeds from logic block 238 to logic block 240 where a check is performed to see if the 9th bit is cleared. If the 9th bit is not cleared, then the routine proceeds again from 240 to logic block 228 and then to logic block 200.

If the 9th bit of the receive message has been cleared at 240, then the communication routine proceeds to logic block 242 where the CRC is accumulated with the CRCH noted. From logic block 242, the communication routine proceeds to logic block 244 where a repeat of the receive procedure is performed for the CRCL. The receive procedure being a repeat of the steps from logic block 224 through logic block 242. Subsequent thereto from logic block 244, the communication routine proceeds to logic block 246 in which a check is performed of the CRCL and the CRCH. If an error appears in either variable CRCL or the CRCH, then the routine proceeds from logic block 246 to logic block 248 where a negative acknowledgement <NAK> is sent to Node 2, thereafter the routine proceeds back to logic block 200. If at logic block 246, both the CRCL and the CRCH are okay, then the routine proceeds to logic block 256 where an acknowledgement is sent. From logic block 252, the routine proceeds to logic block 254 where a check is performed to see if the receive sequence numbers match the stored sequence numbers. If they match, then the routine proceeds from logic block 254 to logic block 258 whereupon an update of the stored sequence numbers are performed and the routine then proceeds to logic block 260 where buffer control is passed to the Node 1 software control. If at logic block 254, the sequence numbers do not match the stored sequence number, then the routine proceeds to logic block 256 where a detection of duplicate message is recorded and therefrom the routine proceeds from logic block 256 to logic block 262 where the receive procedure is noted as finished.

Referring to FIGS. 7a, 7b, 7c and 7d, the Node 2 received procedure is triggered by an address command from Node 1 with the 9th bit set at logic block 270. From logic block 270, the communication routine of the Node 2 proceeds to logic block 272 to check the received data to see if the received data is a command for the establishment of the linking handshake (69). If the data is a established communication command (69), the routine proceeds to logic block 274 whereupon the following messages are sent at logic block 274 to correspond to the message receiving format of the linking routine of Node 1, that is, a send of the communication received command; a link establish command, the reset of the transmit sequence numbers; and a reset device to receive sequence numbers.

If the received data command is to receive message from Node 2 and it is not a request to establish communication, then the routine proceeds to logic block 276 and a check is performed of the address command to ascertain whether the code is the command for indicating communication with Node 3. If the receive command is a Node 3 address-command, the communication routine proceeds from logic block 276 to logic block 278 whereupon a Node 2 wait is executed for the prescribed amount of time that is expected for Node 1 to finish communication with Node 3, thereafter the communication routine returns the ready at logic block 270. From logic block 276, if the address command is not directed towards Node 3, the routine then proceeds from logic block 276 to logic block 278 where the received data is checked again. If the data message is not addressed to Node 2, then the routine proceeds to logic block 282 whereupon the communication routine waits for the amount of time expected for the Node 1 to finish communication with the response message from Node 3. If at logic block 280 the receive data is not addressed to Node 1, then the communication logic of Node 2 proceeds from logic block 280 to logic block 284 and a check is performed to see if the address-command <ADD.COM> is properly addressed to Node 2. If the address is improperly addressed to Node 2, then the logic proceeds to logic block 286 and sends a message indicating that there is a address error. If the address is proper, then the communication logic proceeds from logic block 284 to logic block 288 to check if a link has already been established. If the link has not been established, it sends back to the Node 1 a response code indicting an error condition. If at this time the link has been established, then the routine proceeds from logic block 288 to logic block 292 which tests if the Node 2 receiving buffer 54 is available to receive data. If the receiving buffer is not available, then a buffer not available response is sent to the Node 1 at logic block 294. Thereafter, the routine returns to the ready at 270.

If at logic block 292 the buffer is available, the communication logic proceeds from logic block 292 to logic block 296 in which Node 2 sends back to Node 1 a ready message. From logic block 296, the communication routine proceeds to logic block 298 whereupon the routine waits to receive a buffer count and sequence number for a prescribed time. At this point, the routine proceeds with its data receive sequence indicated by logic blocks 300 through 348 which receive procedure is identical to that receive procedure aforedescribed with respect to logic blocks 214 through 262 respectively as aforedescribed.

Figures 8, 8A, 8B, 8C:
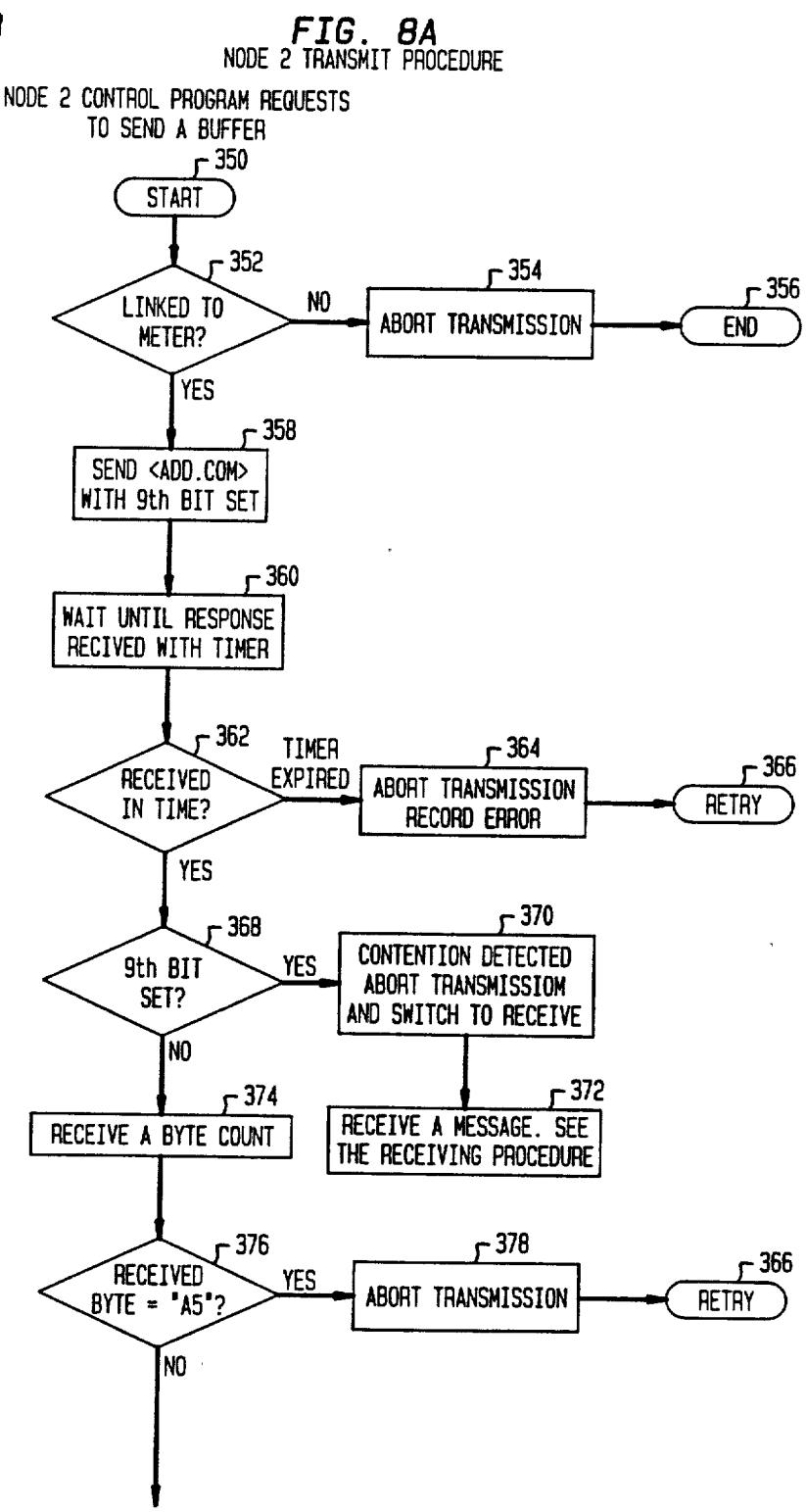
FIGS. 8, 8a, 8b and 8c are schematics of the Node 2 transmit communication logic.
Figure 8B:
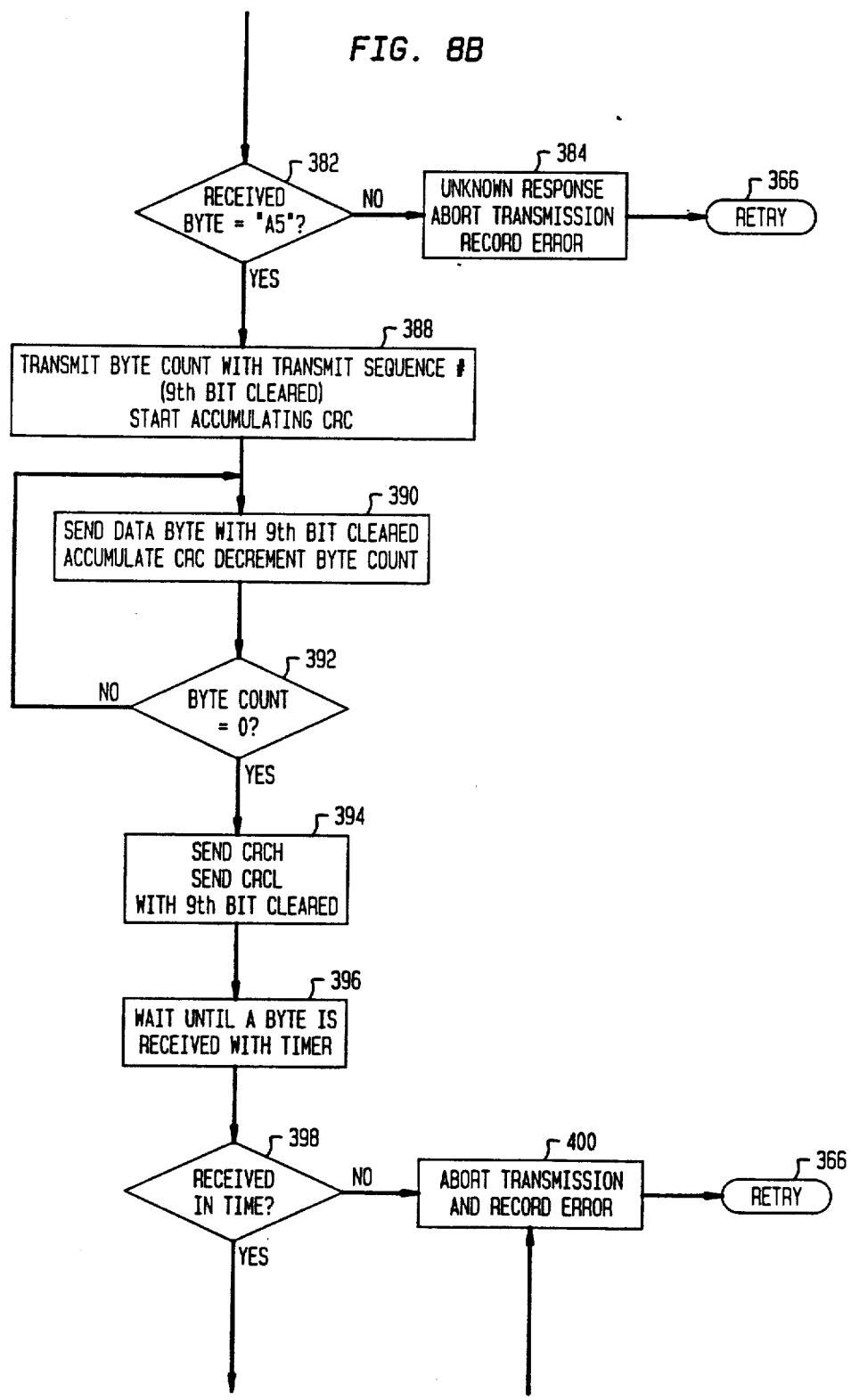
Figure 8C:
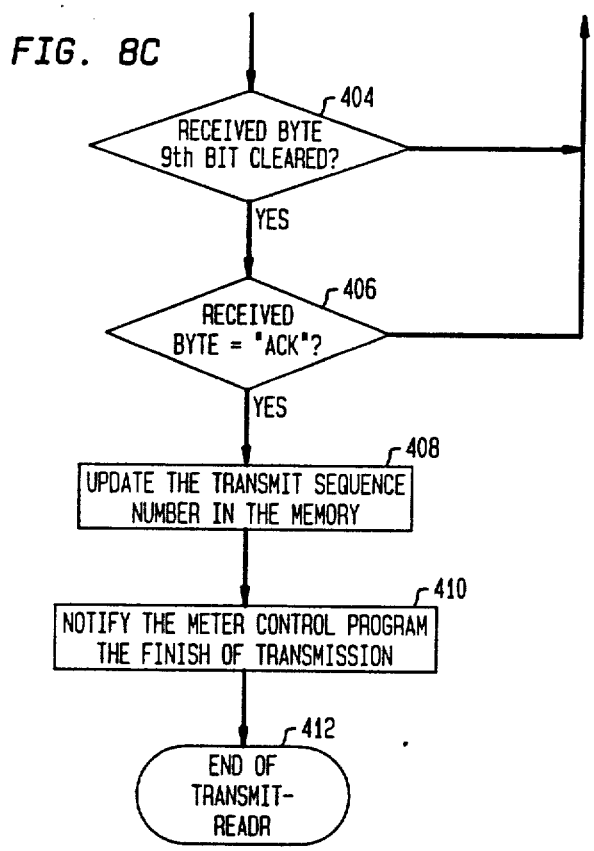

Referring to FIGS. 8a, 8b, and 8c, Node 2 transmit procedure is activated when the Node 2 control program requesting to send a buffer of data at logic block 350. From logic block 350 the transmit communication procedure proceeds to logic block 352 whereupon a check is performed to see if Node 2 is linked to Node 1. If linkage has not been established, the routine proceeds from logic block 352 to logic block 354 where an abort transmission is performed and an end is thereafter executed at logic block 356. If Node 2 is linked to Node 1, the routine proceeds from logic block 352 to logic block 358 where the Node 2 sends a address-command to Node 1 with the 9th bit set. The communication logic then waits as instructed at logic block 360 for a response within the appropriate time. The communication routine then proceeds from logic block 360 to logic block 362 where a check is performed to see if the reply from Node 1 is received in time. If the time is expired, the routine proceeds to logic block 364 where an abort transmission and a error record is made. Therefrom, the routine proceeds to logic block 366 where a retry routine is entered and executed. If the reply from Node 1 is received in time, the routine proceeds from logic block 362 to logic block 368 where a check is performed of the reply to see if the 9th bit is set. If the 9th bit is set, then the communication routine proceeds to logic block 370 whereupon by the 9th bit being set, a contingent problem is detected, transmission is aborted and Node 2 switches to receive mode. From logic block 370, Node 2 then switches to receive a message at 372 according to the message receive routine previously described.

If the 9th bit is not set at logic block 368, the routine proceeds to logic block 374 to receive a byte count. At logic block 376 the receive byte count is checked, if the byte count is improper, the routine proceeds from logic block 376 to logic block 378 where the transmission is aborted and again to logic block 366 to enter the retry routine. If a proper byte count is received at logic block 376, the routine then proceeds to logic block 382 to check the receiving byte to see if the buffer is available. If the buffer is not available, the routine proceeds from logic block 382 to logic block 384 noting the unknown response transmission is abort and the error is recorded and the routine then again tries a retry at logic block 366.

If the respond byte is correct, the routine proceeds from logic block 382 to logic block 388 where the transmitted byte count and sequence numbers are receive and the accumulated CRC's are started and noted that the 9th bit is cleared. At this point, the communication routine is identical to that of aforedescribed with respect to the Node 1 receive mode and proceeds from logic block 383 through logic block 412 which is identical to respective logic blocks 150 through 130 which were aforedescribed.

Figure 8D:
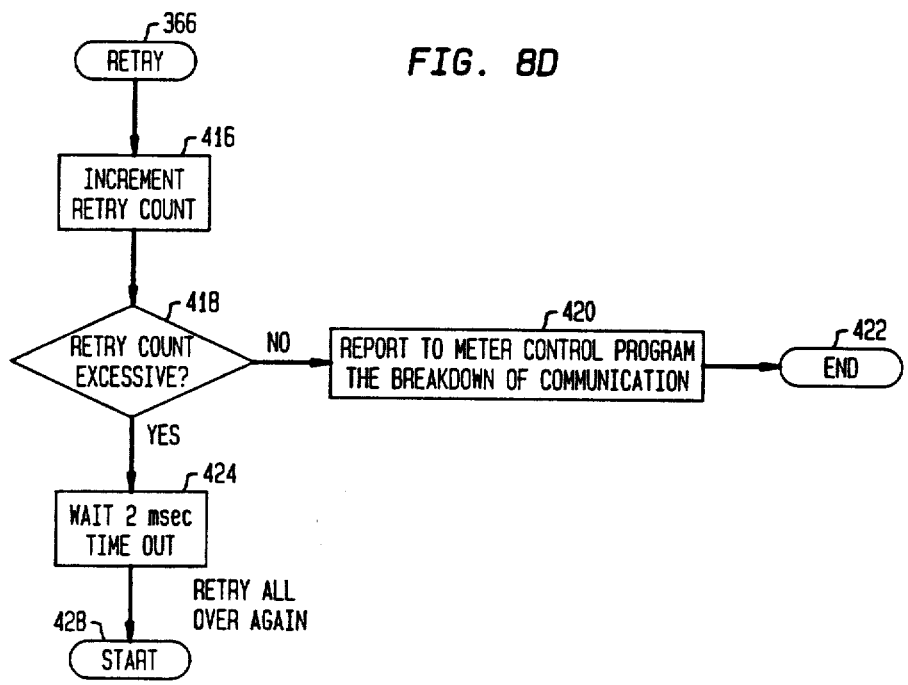
FIG. 8d is a schematic of the Node 2 retry communication logic.

Referring to the FIG. 8d, the retry routine entered by Node 2 for receipt of data from Node 1 is identical to the retry routine shown in FIG. 5d for Node 1. That is, logic blocks 366 through 428 perform the same respective function as aforedescribed with respect to logic blocks 142 through 130.

Referring to FIGS. 9a, 9b, 9c, and 9d as already noted, Node 1 can transmit at will to either Node 2 or Node 3. Node 1 transmit receive procedure to and from Node 3 is instigated by Node 1 control program requesting to send a buffer of information to Node 3 at logic block 430. The communication logic proceeds from logic block 430 to logic block 432 whereupon a check is performed to assure that Node 1 is linked to Node 3. If Node 1 is not linked to Node 3, then the communication logic proceeds to logic block 434 whereupon an abandon transmission routine is performed and a error record is maintained wherefrom the communication logic proceeds from logic block 434 to logic block 436 which signals the communication software to end the transmit procedure. If the link to Node 3 has been established, the communication logic proceeds from logic block 432 to logic block 438 whereupon the proper address-command <ADD.COM> is sent to Node 3 with the 9th bit set. The communication software then proceeds from logic block 438 to logic block 440 where it waits for a response from Node 3 within 50 to 500 micro-seconds. Thereafter, the communication logic proceeds from logic block 440 to logic block 442 where a check is performed to see if a response has been received in time. If the response has not been received in time, the communication logic proceeds from logic block 442 to logic block 444 and an abort transmission is carried out and the error recorded. The communication logic then proceeds from logic block 444 to logic block 448 where a transmission retry routine is entered. If the response is received in time, the communication logic proceeds from logic block 442 to logic block 450 in which the response byte is checked to see if the 9th bit is cleared. If the 9th bit is not cleared, the communication routine proceeds again to logic block 444 and therefrom to logic block 448. If the 9th bit is cleared, then the communication logic proceeds from logic block 450 to 452 where a check is performed to see if Node 3 reply is a valid. If the reply is not valid, the communication logic proceeds to logic block 444 and therefrom the 448 for a retry. If a valid reply code is received, then the communication logic proceeds from logic block 452 to logic block 454 whereafter the communication logic proceeds in a manner identical to that previously described with the respect to Node 1 transmissions to Node 2. That is, Node 1 proceeds in a manner such that from logic block 454 through logic block 474 is identical to the procedure followed aforedescribed logic block 148 through logic block 166.

At logic block 476, Node 1 waits for the first byte count of the buffer transmission from Node 3 which is timed. The communication protocol between Node 1 and Node 3 is not disturbable until Node 3 has fully transmissioned a data response to Node 1. From logic block 476, the communication logic procedures proceeds to logic block 478. At logic block 478, a check is performed to see if the byte count received has been received in time and if the 9th bit is cleared, also, if the byte count is within the proper range. If either condition is not present, the communication logic then proceeds from logic block 478 to logic block 480 where an abort transmission is executed and subsequently at logic block 482 for execution of a retry routine.

Figure 9B:
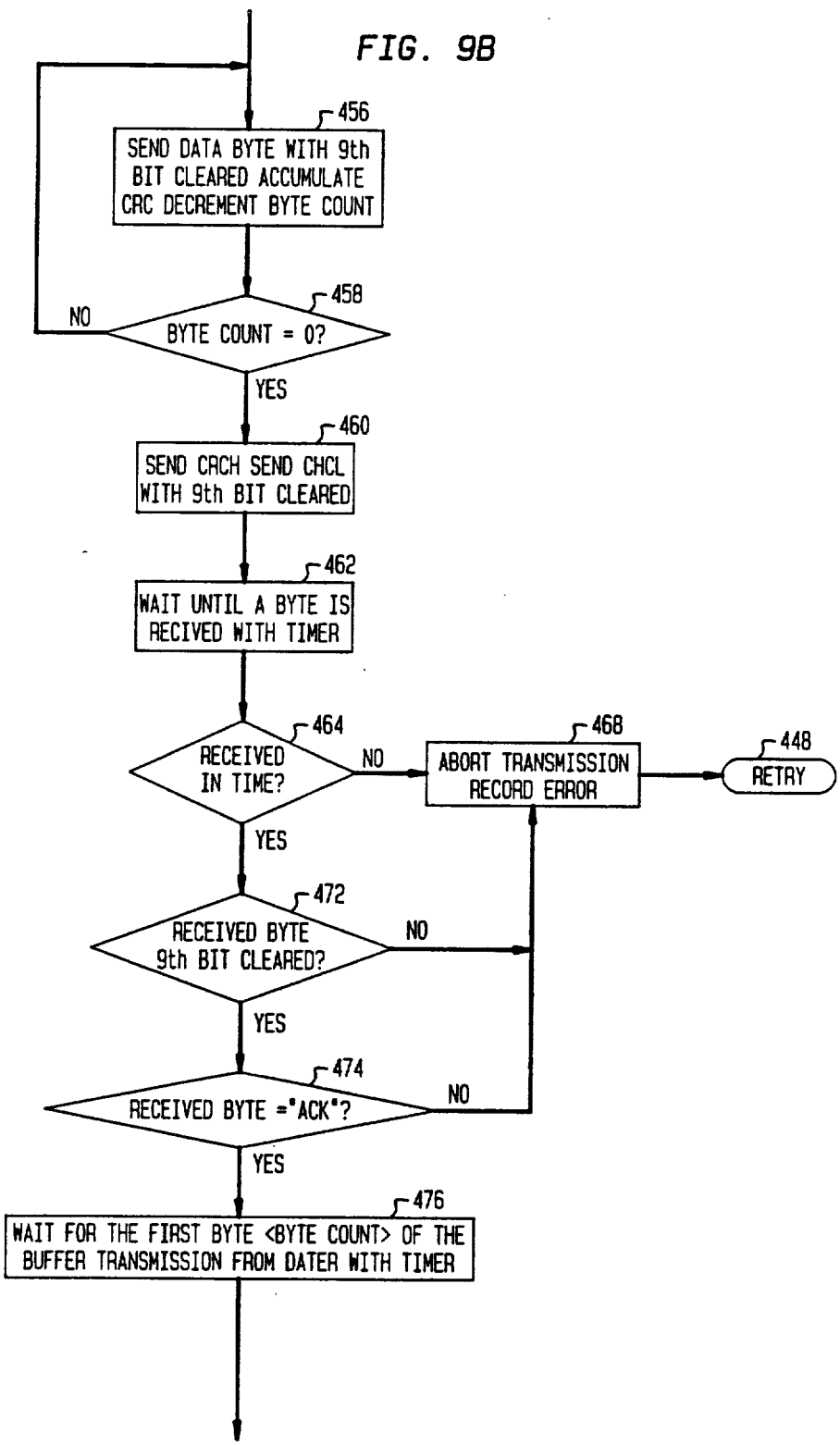
Figure 9D:
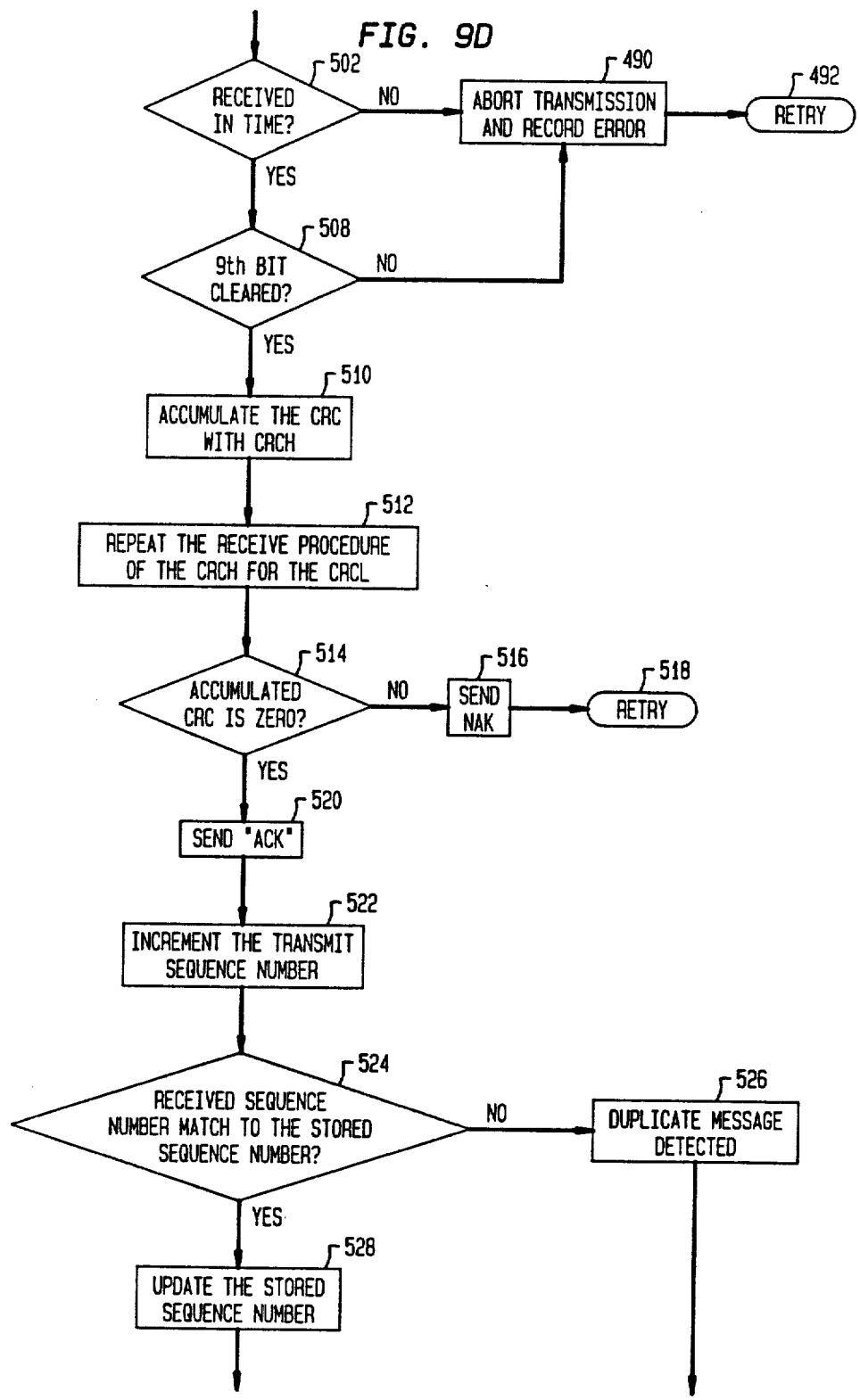
Figures 9E, 9F:
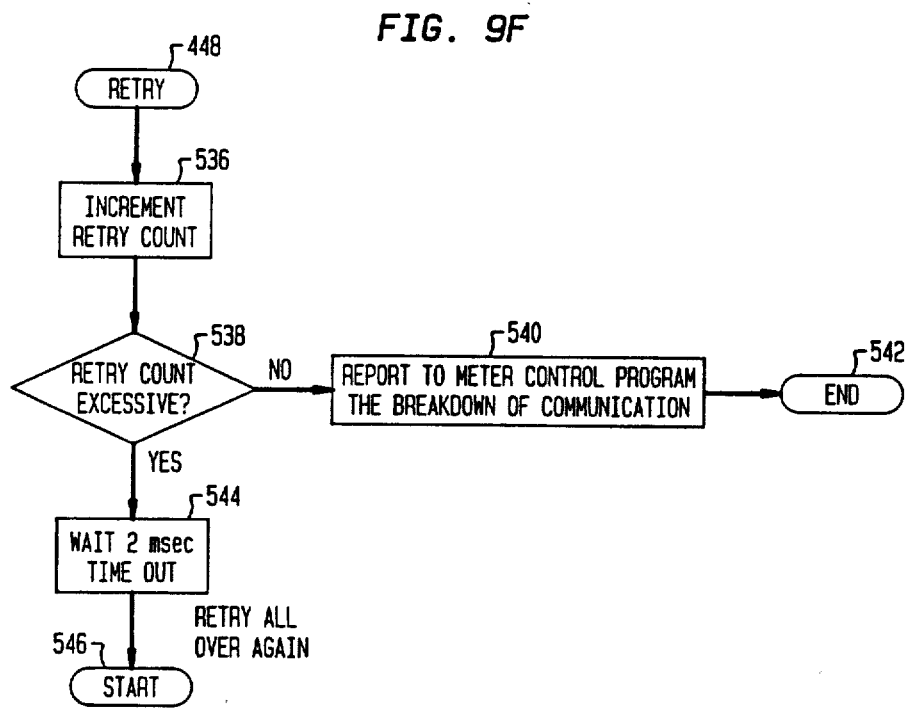
Figure 10C:
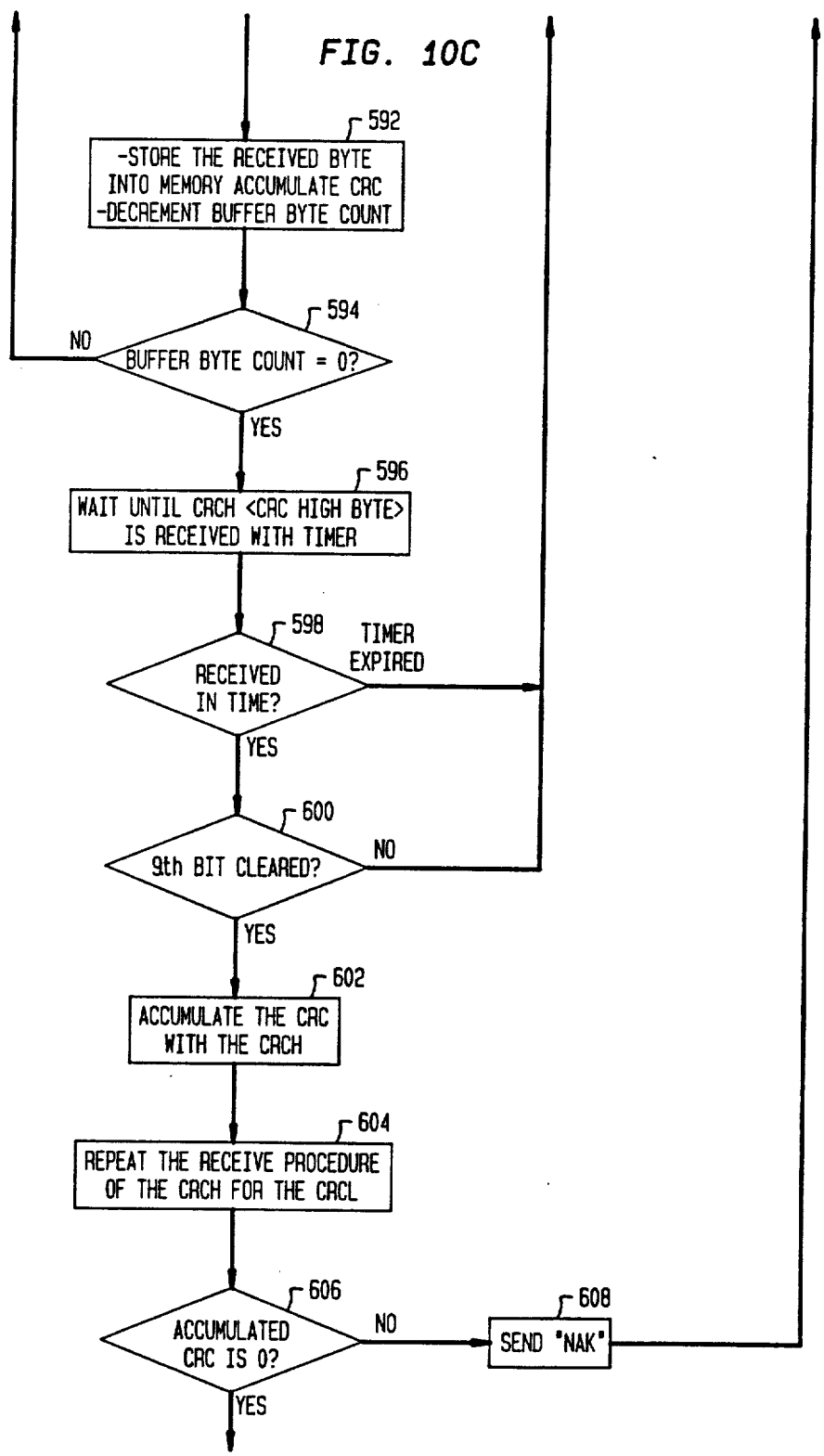
Figure 10D:
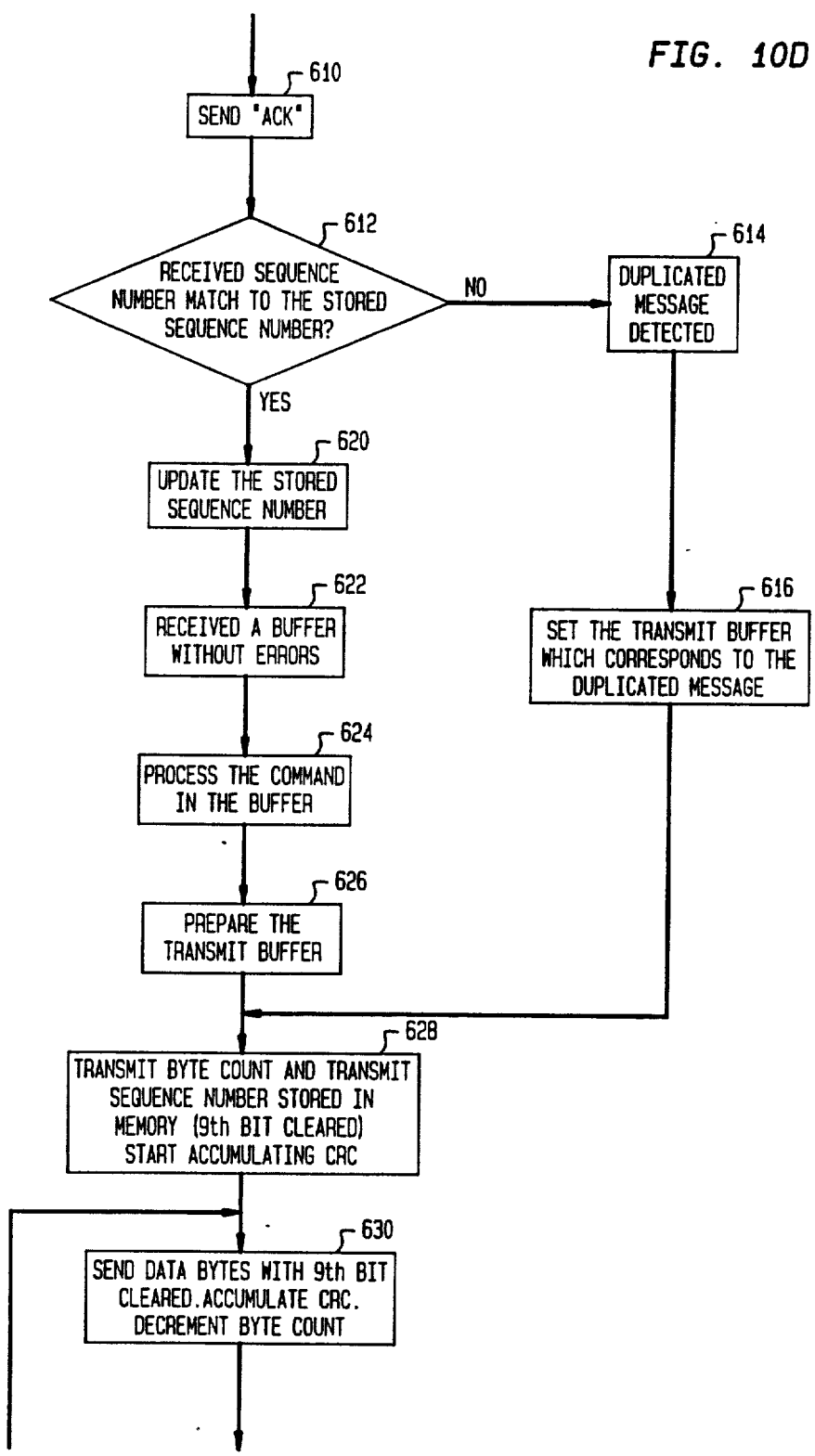
Figure 10E:
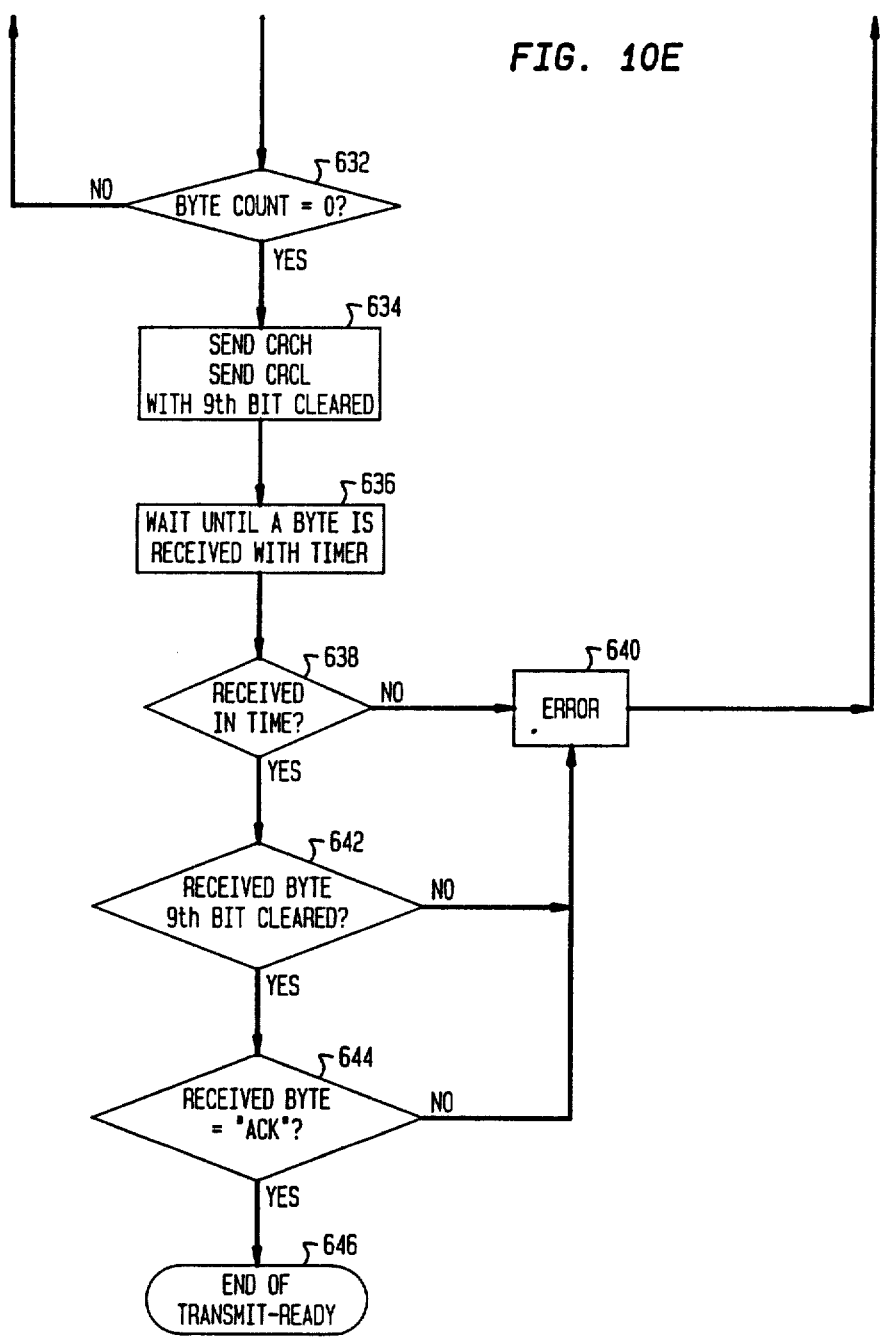

At this point, Node 3 enters a receive mode which is identical to Node 1 receive procedure set forth at logic blocks 220 through 262 and are indicated by respective logic blocks 484 through 538. Referring to FIG. 9f, the retry routine 448 consisting of logic blocks 536 through 546 are identical to the retry routine illustrated on FIG. 5a consisting of respective logic blocks 142 through 190.

Referring now to FIGS. 10a, 10b, 10c, 10d, and 10e, as aforenoted, Node 3 cannot instigate a communication on its own. It can only respond to a communication initiated by Node 1. Node 3 receive transmit procedure is triggered by a communication having the 9th bit set as indicated at logic block 550. Upon receiving a communication, Node 3 communication routine proceeds from logic block 550 to a logic block 552 whereupon a check is performed to see if within the address-command, issued by Node 1, a link establish code has been sent. If a start-up linking code has been sent, then Node 1 proceeds from logic block 522 to logic block 554 whereupon a linkage establish routine is performed in response to the link commands previously described whereby in response to the commands, Node 3 issues the reply code, linking establish code, resets of transmission sequence numbers and resets of receive sequence numbers. The communication logic then proceeds from logic block 554 to the ready at logic block 550.

If at logic block 552, the address-command is not a link establish command, the routine proceeds to logic block 556 where a check is performed of the address-command to see if the address data is intended for Node 3. If the address-command is not intended for the Node 3, the routine then proceeds from 556 to logic block 550 at the ready. If the address-command is other than a linking establishing command, the routine proceeds from logic block 556 to logic block 558 where a check is performed to see if the receive command is intended as a response to a message command issued by Node 2. If the response is intended for Node 2, the Node 3 communication routine proceeds from logic block 558 to logic block 560 whereupon Node 3 is instructed to wait for an amount of time that is expected for the communication to finish between Node 1 and Node 2. If the address-command is not so intended, the communication routine proceeds from logic block 558 to logic block 562 to check if the link has been established between the Node 1 and Node 2. If the link has not been established, then the communication routine proceeds from logic block 556 to logic block 564 where a message is sent to the meter indicating link not established, wherefrom the routine proceeds to logic block 550 to the ready to receive from the meter an establishment routine.

The communication logic then proceeds from logic block 562 to logic block 566 where a check is performed to see if the Node 3 receiving buffer is available. If the buffer is not available, the routine proceeds to logic block 568 and notifies Node 3 that buffer is not available. If the buffer is available, the routine proceeds from logic block 566 to logic block 570 where the Node 3 routine sends to Node 1 a response indicating that it is ready to receive. From logic block 570, the communication routine continues to logic block 572 whereupon the communication routine waits for a buffer byte count and a sequence number within a prescribed time. Subsequently thereto, the communication routine proceeds to a data receive mode illustrated by logic blocks 574 through 612 which sequence is identical to the receive routine set forth for Node 1, respective logic blocks 214 through 252. At logic block 610, the acknowledgement is sent of a successfully received message, the receive communication routine of Node 3 proceeds to logic block 612 in which time a check is made to see if the receive sequence numbers match the stored sequence numbers. If the sequence numbers do not match, the routine proceeds from logic block 612 to logic block 614 where duplicate message is detected and therefrom to logic block 616 whereupon the transmission buffer is set which corresponds to the duplicate message. From logic block 616, the routine proceeds to logic block 628 which will be hereafter described.

Should the sequence numbers match at logic block 612, the communication routine proceeds from logic block 612 to logic block 620 where an update of the stored sequence numbers is performed followed by a message to Node 3 application program citing receipt of the buffer without error at logic block 622. Subsequent, the routine proceeds from logic block 622 to logic block 624 where it processes the command in the buffer. From logic block 624, the communication routine proceeds to logic block 626 where it prepares to transmit the Node 3 buffer. From logic block 626, the routine proceeds into logic block 628 at which logic step Node 3 communication logic switches to a transmit mode and proceeds to transmit the byte count, sequence numbers which are stored in its memory and accumulation of the CRC's is started. Subsequent thereto, the communication logic enters a data send loop at logic block 630. At logic block 630, the data bytes with the 9th bit clear and accumulator CRC decrement byte count are transmitted. The routine proceeds from logic block 630 to logic block 632 where a check is performed to see if the byte count is equal to zero, if not, the routine then proceeds back to 630 until all data is sent. When the byte count has been decremented to zero at logic block 632, the routine proceeds to logic block 634 where the data transmits the CRCH and the CRCL. At logic block 634, the communication logic proceeds to logic block 636 where the routine is instructed to wait for the received byte. At logic block 638, a check is performed to see if the response message has been received in time from Node 1. If not, the routine proceeds to logic block 640 and an error is recorded, and from logic block 640 it returns back to logic block 550. It is noted that a re-transmission retry routine is not entered into at this point, instead Node 3 is set to re-receive the message from the Node 1. If the response is received in time, that is an acknowledgement, then the routine proceeds from logic block 638 to logic block 642 where a check is performed to see if the 9th bit is cleared. If the 9th bit is not cleared, then the routine proceeds to logic block 640 and therefrom to 650. If the 9th bit has been cleared, the transmit routine proceeds to logic block 644 and a acknowledgement is sent. Thereafter, the communication proceeds to logic block 646 to signal end of transmission.

What is claimed is:

1. A communication network, comprising:
   a first, second and third controller node;
   each of said controller nodes having a transmit pin, a receive pin and processor means for generating data messages and causing said data messages to be delivered to said transmit pin and receiving data messages delivered to said receive pin, said transmit pin of said first controller node in line communication with said receive pin of said second controller node and said receive pin of said first controller node in line communication with said transmit pin of said second controller node, said receive pin of said third controller node in line communication with said transmit pin of said first controller node and said transmit pin of said third controller node in line communication with the receive pin of said first controller node;
   each said processor means being programmed to respond to and generate a plurality of data message bytes, each data message byte having one start bit, eight data bits, one programmably settable bit and one stop bit;
   each said processor means further programmed to respond only to a unique address-command data message byte, said address-command byte having said settable bit set, each said processor means to then generate in response thereto a reply message byte with the ninth bit not set, each said means processor to then receive a message count byte followed uninterrupted by a plurality of data message bytes, said message count byte and said data message bytes having the ninth bit not set, each said processing means upon receiving a complete data message conforming to the received count of said count byte to generate an acknowledgement byte;
   said processor means of said first and second controller nodes being further programmed to generate a unique address-command data message byte, said address-command byte having said settable bit set, said processor means of said first and second controller nodes to then receive a reply message byte, said reply message byte to have the ninth bit not set, said processor means of said first and second controller nodes to then transmit a message count byte followed uninterrupted by a plurality of data message bytes, said count byte and said data message bytes having the ninth bit not set, said processor means of said first and second controller nodes to then receive an acknowledgement byte indicating whether the received message was error free;
   said processor means of said third controller node being further programmed after generating such acknowledgement byte to generate a message count byte followed uninterrupted by a plurality of data message bytes, said message count byte and said data message bytes having the ninth bit not set, said processor means of said third controller node to then receive an acknowledgement byte indicating whether the received message was error free.

2. A communication network as claimed in claim 1, further comprising:

said processor means of said second controller node further programmable should said second controller node initiate a transmission to said first controller node receive a reply byte message with the ninth bit set said second controller node processor means will abort said transmission and wait for a predetermined amount of time and subsequent thereto attempt said transmission.

3. A communication network as claimed in claim 2, wherein each said processor means further comprises:
error message detection means for detecting whether said data bytes received are error free such that should said data bytes contain an error said processor means to generate a negative acknowledgement byte or should said data bytes contain no errors said processor means to generate a positive acknowledgement byte.

4. A communication network as claimed in claim 3, wherein said error message detection means comprises:
said message count byte containing a sequence number, said processor means being programmed to calculate a cyclic redundancy checksum as a function of the data bytes and compare said cyclic redundancy checksum with a checksum calculated as a function of said sequence number such that should said checksums match said data message is error free, should said checksums not match said data message contains a error.

5. A communication network, comprising:
a first, second and third controller node;
each of said controller nodes having a transmit pin, a receive pin and processor means for generating data messages and causing said data messages to be delivered to said transmit pin and receiving data messages delivered to said receive pin, said transmit pin of said first controller node pin in line communication with said receive pin of said second controller node and said receive pin of said first controller node in line communication with said transmit pin of said second controller node, said receive pin of said third controller node in line communication with said transmit pin of said first controller node and said transmit pin of said third controller node in line communication with the receive pin of said first controller node;
each said processor means being programmed to respond to and generate a plurality of data message bytes, each data message byte having one start bit, eight data bits, one programmably settable bit and one stop bit;
each said processor means being further programmed to respond only to a unique address-command data message byte, said address-command byte having said settable bit set, each said processor means to then generate in response thereto a reply message byte with the ninth bit not set, each said processor to then receive a message count byte followed uninterrupted by a plurality of data message bytes, said message count byte and said data message bytes having the ninth bit not set, each said processor upon receiving a complete data message conforming to the received count of said count byte to generate an acknowledgement byte;
said processor means of said first and second controller nodes being further programmed to generate a unique address-command data message byte, said address-command byte having said settable bit set, said processor means of said first and second controller nodes to then receive a reply message byte, said reply message byte to have the ninth bit not set, said processor means of said first and second controller nodes to then transmit a message count byte followed uninterrupted by a plurality of data message bytes, said count byte and said data message bytes having the ninth bit not set, said processor means of said first and second controller nodes to then receive an acknowledgement byte indicating whether the received message was error free;
said processor means of said third controller node being further programmed after generating said acknowledgement byte to generate a message count byte followed uninterrupted by a plurality of data message bytes, said message count byte and said data message bytes having the ninth bit not set, said processor means of said third controller node to then generate an acknowledgement byte indicating whether the received message was error free;
said processor means of said second controller node further being programmed such that should said second controller node initiate a transmission to said first controller node receive a reply byte message with the ninth bit set said second controller node processor means will abort said transmission and wait for a predetermined amount of time and subsequent thereto attempt said transmission.

6. A communication network as claimed in claim 5, wherein said processor means further comprises:
error message detection means for detecting whether said received data bytes are error free such that should said data bytes contain an error said processor means to generate a negative acknowledgement byte or should said data byte contain no errors said processor means to generate a positive acknowledgement byte.

* * * * *